US012811734B2

(12) United States Patent
Ding et al.

(10) Patent No.: US 12,811,734 B2
(45) Date of Patent: Nov. 24, 2026

(54) COMMUNICATION APPARATUS AND COMMUNICATION METHOD FOR AGGREGATED SIGNAL

(71) Applicant: Panasonic Intellectual Property Corporation of America, Torrance, CA (US)

(72) Inventors: Yanyi Ding, Singapore (SG); Yoshio Urabe, Nara (JP); Rojan Chitrakar, Singapore (SG)

(73) Assignee: Panasonic Intellectual Property Corporation of America, Torrance, CA (US)

( * ) Notice: Subject to any disclaimer, the term of this patent is extended or adjusted under 35 U.S.C. 154(b) by 366 days.

(21) Appl. No.: 18/291,199

(22) PCT Filed: Jun. 17, 2022

(86) PCT No.: PCT/SG2022/050424

§ 371 (c)(1),
(2) Date: Jan. 22, 2024

(87) PCT Pub. No.: WO2023/022650

PCT Pub. Date: Feb. 23, 2023

(65) Prior Publication Data

US 2024/0214138 A1 Jun. 27, 2024

(30) Foreign Application Priority Data

Aug. 20, 2021 (SG) ............................ 10202109139S

(51) Int. Cl.
*H04L 5/00* (2006.01)
*H04W 72/121* (2023.01)

(52) U.S. Cl.
CPC ......... *H04L 5/0044* (2013.01); *H04W 72/121* (2013.01)

(58) Field of Classification Search
CPC ..... H04L 1/1642; H04L 47/34; H04L 1/1607; H04L 5/001; H04L 5/0044; H04L 5/00;
(Continued)

(56) References Cited

U.S. PATENT DOCUMENTS

2013/0070701 A1 3/2013 Merlin et al.
2021/0028917 A1 * 1/2021 Park ...................... H04W 72/23
(Continued)

FOREIGN PATENT DOCUMENTS

EP 4387154 A2 * 6/2024 ........... H04L 5/0053
JP 2017085662 A 5/2017

OTHER PUBLICATIONS

Han et al., Samsung, "Trigger Frame for Frequency-domain A-PPDU Support," doc.: IEEE 802.11-20/0831r2, Mar. 2020, 19 pages.
(Continued)

*Primary Examiner* — Nathan S Taylor
(74) *Attorney, Agent, or Firm* — Seed Intellectual Property Law Group LLP

(57) ABSTRACT

The present disclosure provides communication apparatuses and methods for transmitting and/or receiving an aggregated signal, the communication apparatus comprising: circuitry which, in operation, is configured to indicate one or more operating channels of a plurality of operating channels to a group of associated communication apparatuses in which a signal allocated to the group of associated communication apparatuses will be transmitted, and generate a signal allocated to the group of associated communication apparatuses and another signal(s) allocated to another group(s) of associated communication apparatuses; and a transmitter which, in operation, transmits an aggregated signal comprising the signal and the other signal(s) simultaneously.

14 Claims, 37 Drawing Sheets

(58) Field of Classification Search

CPC ............... H04W 28/06; H04W 28/082; H04W 28/0865; H04W 28/09; H04W 76/15; H04W 88/06; H04W 72/0453; H04W 72/121; H04W 84/12; H04W 48/08; H04W 72/04; H01L 21/6875; H01L 21/687; H01L 21/027; H01L 21/304; H01L 21/67; H01L 21/683; G03F 7/707; G03F 7/70975; G03F 7/7095; G03F 7/00; G03F 7/20

See application file for complete search history.

(56) References Cited

U.S. PATENT DOCUMENTS

| | | | | |
|---|---|---|---|---|
| 2021/0204299 | A1* | 7/2021 | Yun | H04W 72/542 |
| 2021/0227529 | A1* | 7/2021 | Chu | H04W 72/23 |
| 2021/0250125 | A1* | 8/2021 | Park | H04L 27/2603 |
| 2021/0250911 | A1 | 8/2021 | Cariou et al. | |
| 2021/0307099 | A1* | 9/2021 | Ryu | H04W 76/15 |
| 2021/0320754 | A1* | 10/2021 | Yun | H04L 27/261 |
| 2021/0360521 | A1* | 11/2021 | Seok | H04W 52/0203 |
| 2022/0030450 | A1* | 1/2022 | Lu | H04L 1/0008 |
| 2022/0038317 | A1* | 2/2022 | Lim | H04L 25/0228 |
| 2022/0061051 | A1* | 2/2022 | Song | H04W 72/0453 |
| 2022/0104257 | A1* | 3/2022 | Ryu | H04W 74/0866 |
| 2022/0110119 | A1* | 4/2022 | Song | H04L 5/001 |
| 2022/0183062 | A1* | 6/2022 | Seok | H04W 28/0278 |
| 2022/0224381 | A1* | 7/2022 | Yun | H04B 7/063 |
| 2022/0271980 | A1* | 8/2022 | Lim | H04L 27/26132 |
| 2022/0361170 | A1* | 11/2022 | Park | H04L 27/262 |
| 2023/0163808 | A1* | 5/2023 | Lou | H04B 7/024 455/101 |
| 2023/0309151 | A1* | 9/2023 | Kim | H04W 74/0866 |
| 2023/0379999 | A1* | 11/2023 | Kim | H04W 76/20 |
| 2024/0324030 | A1* | 9/2024 | Chitrakar | H04W 74/0833 |

OTHER PUBLICATIONS

International Search Report dated Jan. 31, 2023, for the corresponding International Patent Application No. PCT/SG2022/050424, 2 pages.

Park et al., LG Electronics, “UL Spatial Reuse Subfield Design in Enhanced Trigger Frame,” doc: IEEE 802.11-21/0152r1, Jan. 2021, 17 pages.

Cao et al., NXP, “Aggregated PPDU for Large BW,” doc.: IEEE 02.11-20/0693r0, May 2020. (7 pages).

Extended European Search Report, dated Apr. 11, 2024, Supplementary European Search Report, dated Oct. 16, 2024, for European Application 22858846.3-1206. (8 pages).

Han et al. Samsung, “Trigger Frame for Frequency-domain A-PPDU Support,” doc.: IEEE 802.11-20/0831r1, Mar. 2020. (17 pages).

* cited by examiner

COMMUNICATION APPARATUS AND COMMUNICATION METHOD FOR AGGREGATED SIGNAL

TECHNICAL FIELD

The present embodiments generally relate to communication apparatuses and methods for an aggregated signal, and more particularly relate to methods and apparatuses for transmitting and/or receiving an aggregated Physical Layer Protocol Data Unit (A-PPDU) in the context of extremely high throughput wireless local area network (EHT WLAN).

BACKGROUND

In the standardization of next-generation WLAN, a new radio access technology (EHT) necessarily having backward compatibility with IEEE 802.11a/b/g/n/ac/ax technologies has been discussed in the IEEE 802.11be Task Group.

In 802.11be EHT WLAN, in order to achieve good throughput gain with traffic from mixed generations of STAs in large bandwidth, it has been proposed to define A-PPDU which consists of multiple PPDUs. However, there is not much discussion on downlink (DL) transmission of an A-PPDU especially an A-PPDU consisting of PPDUs of different amendments within a basic service set (BSS) which selective subchannel transmission (SST) is not supported.

There is thus a need for a communication apparatus and a communication method for transmitting and/or receiving an aggregated signal to solve the above-mentioned issues. Furthermore, other desirable features and characteristics will become apparent from the subsequent detailed description and the appended claims, taken in conjunction with the accompanying drawings and this background of the disclosure.

SUMMARY

Non-limiting and exemplary embodiments facilitate providing communication apparatuses and communication methods for transmitting and/or receiving an aggregated signal.

In a first aspect, the present disclosure provides a base communication apparatus comprising: circuitry which, in operation, is configured to indicate one or more operating channels of a plurality of operating channels to a group of associated communication apparatuses in which a signal allocated to the group of associated communication apparatuses will be transmitted, and generate a signal allocated to the group of associated communication apparatuses and another signal(s) allocated to another group(s) of associated communication apparatuses; and a transmitter which, in operation, transmits an aggregated signal comprising the signal and the other signal(s) simultaneously.

In a second aspect, the present disclosure provides an associated communication apparatus of a group of associated communication apparatuses comprising: a receiver which, in operation, receives from a base communication apparatus, information relating to one or more operating channels of a plurality of operating channels in which a signal allocated to the group of associated communication apparatuses will be transmitted, and an aggregated signal comprising a signal allocated to the group of associated communication apparatuses and another signal(s) allocated to another group(s) of associated communication apparatuses simultaneously; and circuitry which, in operation, is configured to decode the aggregated signal.

In a third aspect, the present disclosure provides a communication method comprising: indicate one or more operating channels of a plurality of operating channels to a group of associated communication apparatuses in which a signal allocated to the group of associated communication apparatuses will be transmitted, and generating a signal allocated to the group of associated communication apparatuses and another signal(s) allocated to another group(s) of associated communication apparatuses; and transmitting an aggregated signal comprising the signal and the other signal(s) simultaneously.

Additional benefits and advantages of the disclosed embodiments will become apparent from the specification and drawings. The benefits and/or advantages may be individually obtained by the various embodiments and features of the specification and drawings, which need not all be provided in order to obtain one or more of such benefits and/or advantages.

BRIEF DESCRIPTION OF THE DRAWINGS

The accompanying figures, where like reference numerals refer to identical or functionally similar elements throughout the separate views and which together with the detailed description below are incorporated in and form part of the specification, serve to illustrate various embodiments and to explain various principles and advantages in accordance with present embodiments.

Figure 1:
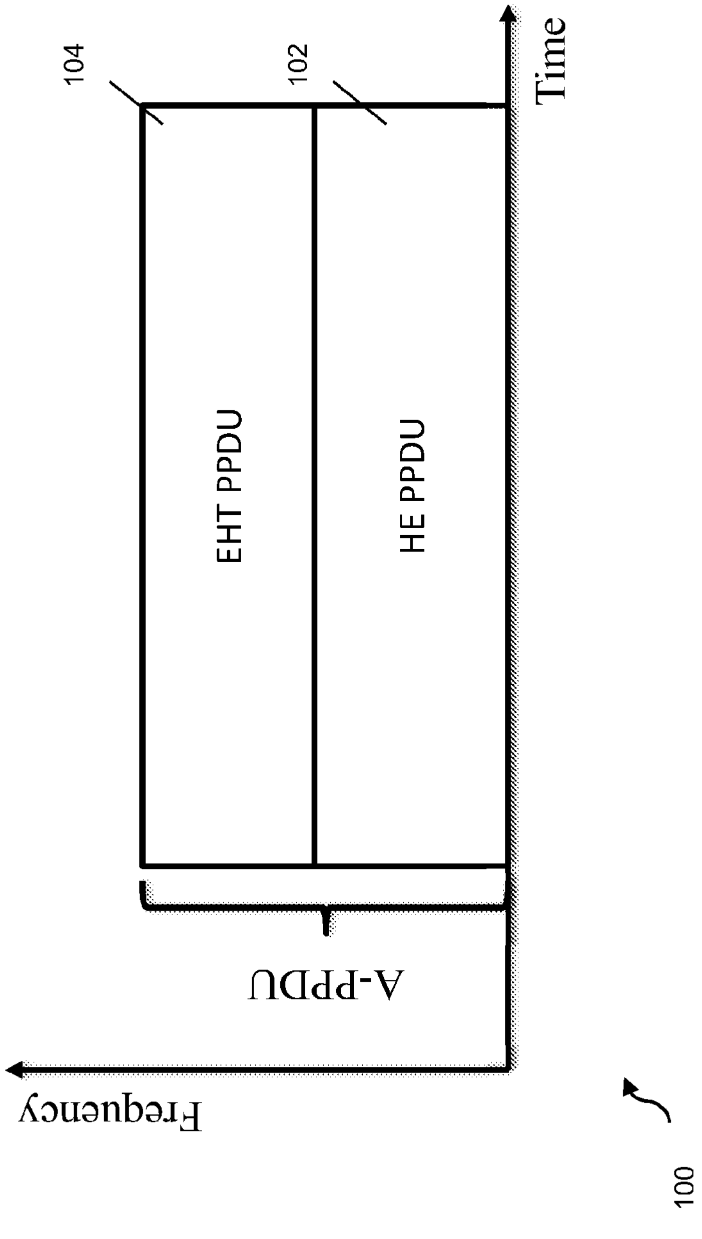
FIG. 1 depicts a frequency-time graph illustrating an A-PPDU.

Skilled artisans will appreciate that elements in the figures are illustrated for simplicity and clarity and have not necessarily been depicted to scale. For example, the dimensions of some of the elements in the illustrations, block diagrams or flowcharts may be exaggerated in respect to other elements to help an accurate understanding of the present embodiments.

DETAILED DESCRIPTION

The following detailed description is merely exemplary in nature and is not intended to limit the embodiments or the application and uses of the embodiments. Furthermore, there is no intention to be bound by any theory presented in the preceding Background or this Detailed Description. Furthermore, other desirable features and characteristics will become apparent from the subsequent detailed description and the appended claims, taken in conjunction with the accompanying drawings and this background of the disclosure.

In the context of IEEE 802.11 (Wi-Fi) technologies, a station, which is interchangeably referred to as a STA, is a communication apparatus that has the capability to use the 802.11 protocol. Based on the IEEE 802.11-2020 definition, a STA can be any device that contains an IEEE 802.11-conformant media access control (MAC) and physical layer (PHY) interface to the wireless medium (WM).

For example, a STA may be a laptop, a desktop personal computer (PC), a personal digital assistant (PDA), an access point or a Wi-Fi phone in a wireless local area network (WLAN) environment. The STA may be fixed or mobile. In the WLAN environment, the terms "STA", "wireless client", "user", "user device", and "node" are often used interchangeably.

Likewise, an AP, which may be interchangeably referred to as a wireless access point (WAP) in the context of IEEE 802.11 (Wi-Fi) technologies, is a communication apparatus that allows STAs in a WLAN to connect to a wired network. The AP usually connects to a router (via a wired network) as a standalone device, but it can also be integrated with or employed in the router.

As mentioned above, a STA in a WLAN may work as an AP at a different occasion, and vice versa. This is because communication apparatuses in the context of IEEE 802.11 (Wi-Fi) technologies may include both STA hardware components and AP hardware components. In this manner, the communication apparatuses may switch between a STA mode and an AP mode, based on actual WLAN conditions and/or requirements.

In various embodiments below, an AP may be referred to as a base communication apparatus and a STA associated with an AP within a basic service set (BSS) may be referred to as an associated communication apparatus.

In various embodiments of the present disclosure, the term "frequency segment" may be used interchangeably with the term "channel" and a STA's operating channel could mean a frequency segment the STA is operating in. In the present disclosure, one or more operating channels may be allocated to a STA to transmit/receive signals to/from another STA or an AP within a BSS.

In various embodiments of the present disclosure, an amendment may refer to an amendment in the 802.11 standard. STAs of different amendments may refer to STAs of different generations compatible (or configured) to operate in operating modes and features offered in different 802.11 standards respectively. Examples of STAs of different amendments are High Throughput (HT), Very High Throughput (VHT), High Efficiency (HE) and EHT (Extremely High Throughput (EHT) STAs which capable of operating in operating modes and features offered in 802.11m/ac/ac/be standards respectively. In addition, STAs of a generation newer than EHT STAs (STAs with amendments after EHT) are referred to EHT+STAs in the present disclosure. Generally, STAs of newer generations (e.g. EHT/EHT+STAs) can still perform all the operations of their own generations as well as that of older generations (e.g. HE STAs).

Similarly, PPDUs of different amendments may refer to PPDUs (e.g. HE PPDUS, EHT PPDUS, EHT+PPDU) configured to be transmitted/received by STAs of different generations (e.g. HE STAs, EHT STAs, EHT+STAs) to carry out their operations offered in the standards respectively. Generally, STAs of newer generations (e.g. EHT/EHT+STAs) can still make use of PPDUs of their own generations (e.g. EHT/EHT+PPDUs) as well as those of older generations (e.g. HE PPDUs).

In various embodiments of the present disclosure, a group of STAs may refer to two or more STAs within a BSS to which a signal in an aggregated signal (e.g. a DL PPDU in an A-PPDU) may be allocated or directed. In one embodiment, groups are divided according to amendments, and a group of STAs refers to a group of STAs of a generation/amendment (e.g. a group of HE STAs, a group of EHT STAs). In another embodiment, STAs of different amendments may also form a group of STAs according to features or operating modes.

In various embodiments below, a L-STF, a L-LTF, a L-SIG field and a RL-SIG field in the preamble of a PPDU may be grouped together and referred to as a L-part of the PPDU.

It has been mentioned that 802.11be EHT defines A-PPDU which consists of multiple PPDUs. FIG. 1 depicts a frequency-time graph 100 illustrating an A-PPDU. PPDUs of different amendments (in this case, HE PPDU 102 and EHT PPDU 104) are included in the A-PPDU. PPDUs consisted in an A-PPDU are orthogonal in frequency domain/segment symbol-by-symbol. In other words, the HE PPDU 102 and the EHT PPDU 104 consisted in the A-PPDU are transmitted simultaneously in different frequency segments. Advantageously, A-PPDU enables simultaneously transmission to STAs of different amendments with high efficiency. In 802.11ax and 11be, selective subchannel transmission (SST) is an optional feature. Under SST, a non-AP STA may listen to an allocated subchannel instead of primary channel. However, overhead of SST setup is needed under SST operation.

Figure 2:
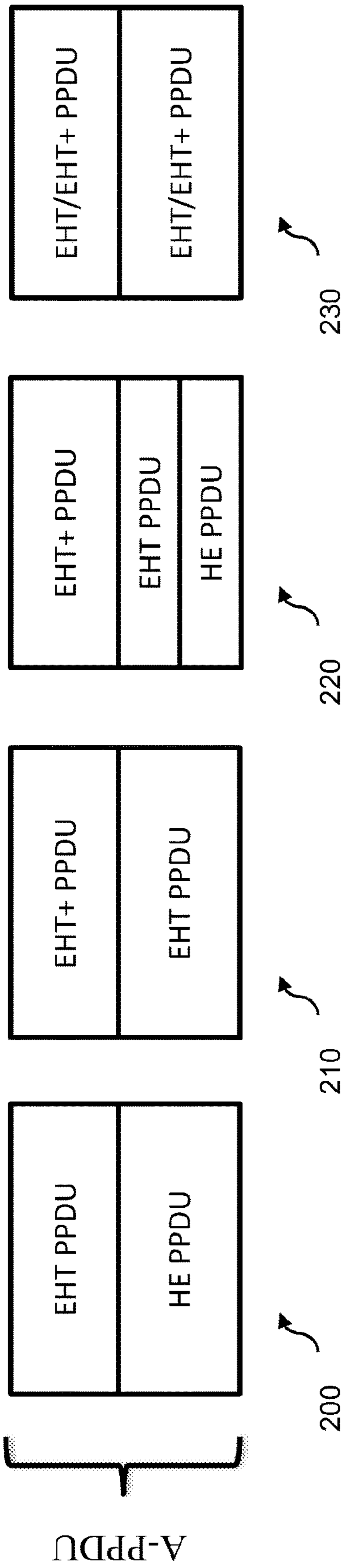
FIG. 2 depicts four A-PPDUs with different PPDU combinations.

An A-PPDU can have different combinations. FIG. 2 depicts four A-PPDUs 200, 210, 220, 230 with different PPDU combinations. An A-PPDU can have a combination of PPDUs of different amendments in different frequency segments. For example, the A-PPDU 200 comprises a combination of an HE PPDU and an EHT PPDU; the A-PPDU 210 comprises a combination of an EHT PPDU and an EHT+PPDU; and the A-PPDU 220 comprises a combination of an HE PPDU. EHT PPDU and EHT+PPDU. An A-PPDU can also have a combination of PPDUs of a same amendment in different frequency segments. For example, the A-PPDU 230 comprises a combination of two EHT/EHT+PPDUs.

Figure 3:
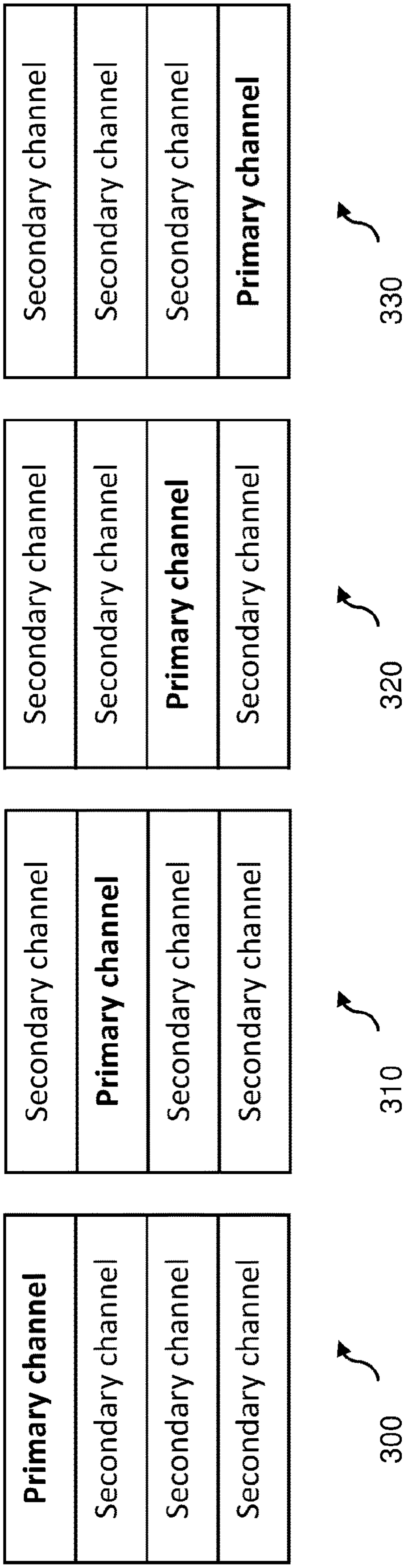
FIG. 3 depicts four different positions of a 20 MHz primary operating channel allocated in an 80 MHz signal transmitted within a basic service set (BSS).

A primary operating channel (typically a 20 MHz channel) is a common channel of operation for all STAs that are members of a basic service set, while all the other channels within the BSS are secondary channels. A position of the primary operating channel is broadcasted during an association phase between an AP of the basic service set and the STAs. FIG. 3 depicts four different positions of a 20 MHz primary operating channel allocated in an 80 MHz signal 300, 310, 320, 330 transmitted within a basic service set (BSS). For example, the 20 MHz primary operating channel can be a 20 MHz channel at the highest frequency second highest frequency, second lowest frequency and the lowest frequency like that in the signals 300, 310, 320, 330 respectively.

A 40/80/160 MHz segment that overlaps the primary operating channel is the primary 40/80/160 MHz while a 40/80/160 MHz segment that does not overlap the primary operating channel is the secondary 40/80/160 MHz.

Figure 4:
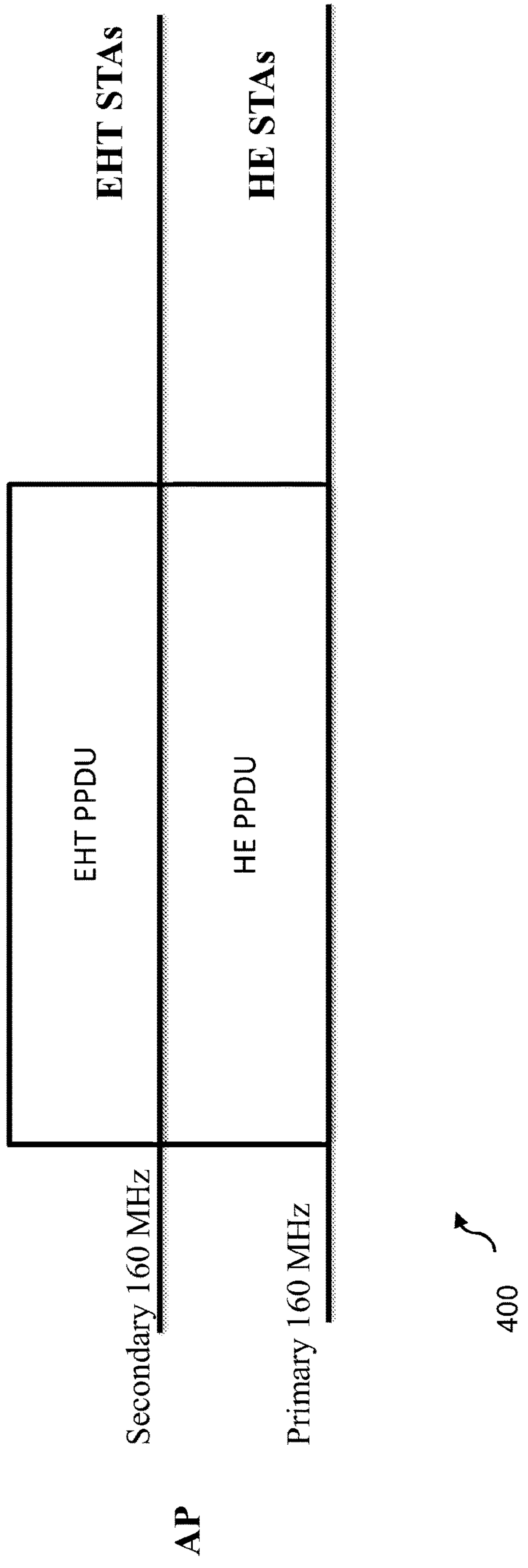
FIG. 4 depicts a frequency-time graph illustrating an A-PPDU transmitted with (SST) operation support.

It is a possible solution to transmit A-PPDUs with SST operation. FIG. 4 depicts a frequency-time graph 400 illustrating an A-PPDU transmitted with (SST) operation support. In this example, HE STAs park on the primary 160 MHz channel while EHT STAs park on the secondary 160 MHz channel. The AP transmits an A-PPDU containing an HEPPDU in the primary 160 MHz channel and an EHT PPDU in the secondary 160 MHz channel. Correspondingly, HE and EHT STAs will receive the PPDUs of their amendments, i.e. HE and EHT PPDUs, only.

Figure 5:
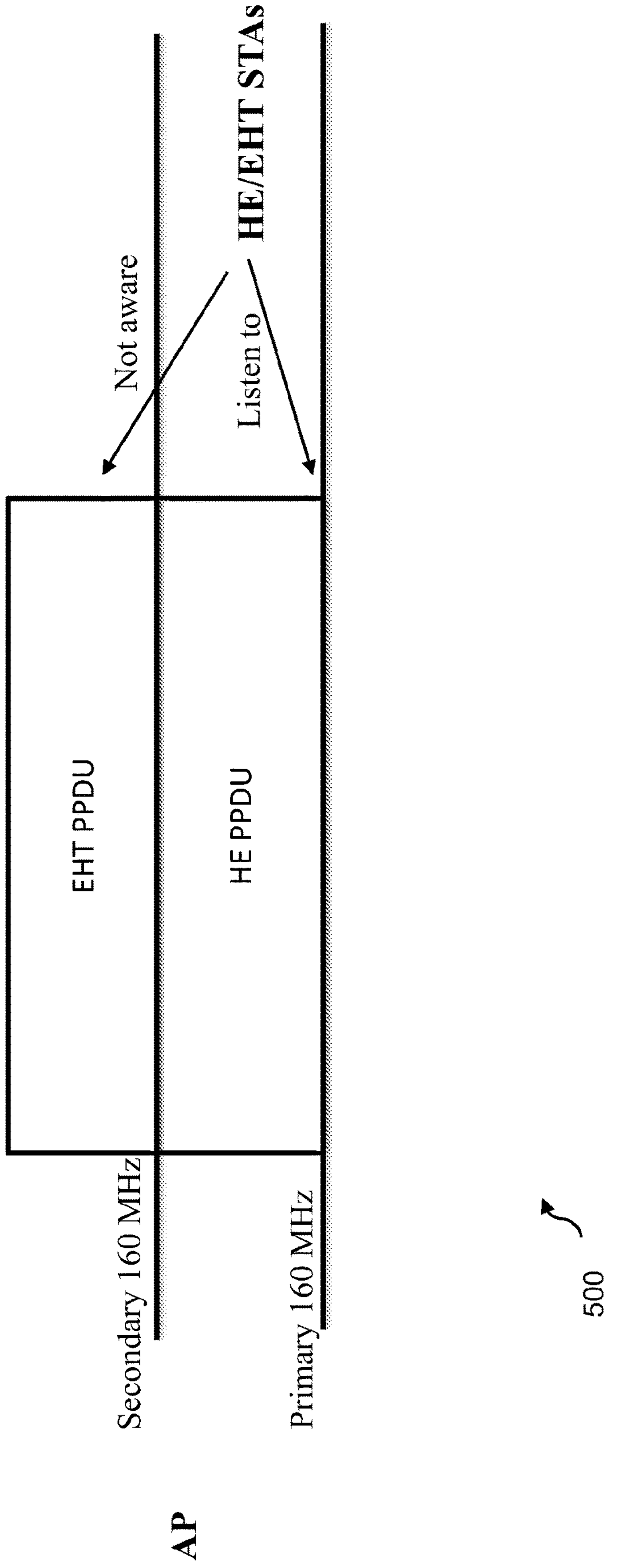
FIG. 5 depicts a frequency-time graph illustrating an A-PPDU transmitted without SST operation support.

When SST is not supported, for example the AP does not or the STAs do not support SST, DL A-PPDU transmission is difficult to be realized. FIG. 5 depicts a frequency-time graph illustrating an A-PPDU transmitted without SST operation support. In this example, as SST is not supported, all associated HE/EHT STAs listen to the primary 160 MHz channel. Correspondingly, EHT STAs only receive information from preamble of HE PPDU, and thus are not aware of the EHT PPDU transmission in secondary 160 MHz channel.

Figure 6A:
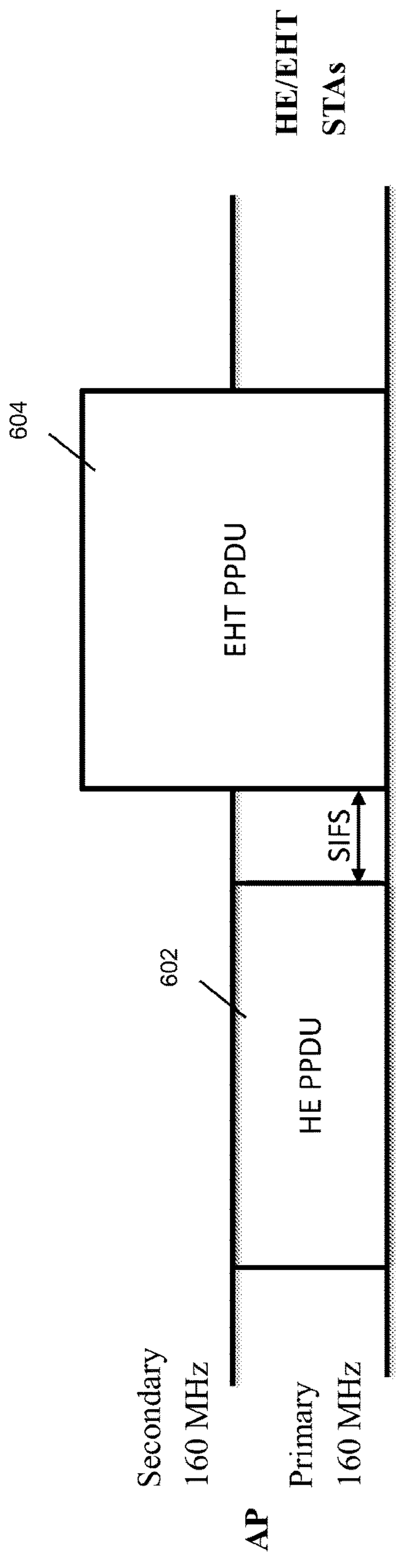
FIG. 6A depicts PPDUs of two amendments transmitted sequentially.
Figure 6B:
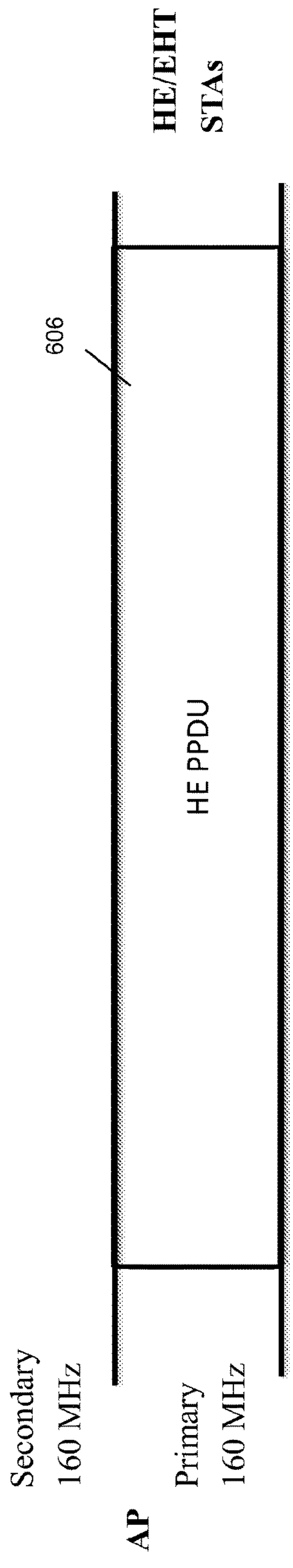
FIG. 6B depicts a single HE PPDU transmitted to both HE and EHT STAs.

Conventionally, to resolve this issue when a BSS does not support SST, the AP may transmit PPDUs of different amendments sequentially or a single HE PPDU to all STAs of different amendments. FIG. 6A depicts PPDUs of two amendments 602, 604 transmitted sequentially. The AP transmits an HE PPDU in the primary 160 MHz channel to HE STAs and then, after Short Interframe Spacing (SIFS), an EHT PPDU in both the primary 160 MHZ channel and secondary 160 MHz channel. FIG. 6B depicts a single HE PPDU 606 transmitted to both HE and EHT STAs. The AP transmit the single HE PPDU 606, rather than an aggregated PPDU, to HE and EHT STAs when SST is not supported.

According to the present disclosure, a DL A-PPDU transmission without SST may be carried out by informing non-AP STAs, by an AP, parameters of DL A-PPDU that are supported, where an A-PPDU contains more than one PPDU such as a primary PPDU which overlaps the primary operating channel and a second PPDU which does not overlap the primary operating channel. It is noted that there could be more than one secondary PPDU if more than two PPDUs are contained in the A-PPDU. Subsequently, receiver non-AP STAs, which receives the parameters will determine whether a DL PPDU is an A-PPDU and which PPDU carries the allocated data during the preamble decoding phase.

There may be three types of DL A-PPDU transmission without SST, which will be described in the first, second and third embodiments of the present disclosure respectively:

1. Static A-PPDU: A-PPDUs transmitted during a transmission opportunity (TXOP) or a duration shall be of a same pattern;
2. Dynamic A-PPDU: A-PPDUs transmitted during a TXOP/duration may be of different pattern; and
3. Half-Dynamic A-PPDU: some parameters of A-PPDUs transmitted during an TXOP/duration are limited while other parameters may change.

Various embodiments of the present disclosure are based on an operating assumption that an AP shall not transmit a secondary PPDU (a PPDU transmitted in the secondary operating channel) in an A-PPDU to a non-AP STA that does not support SST or reception of A-PPDU without SST. In other words, an AP shall allocate the primary operating channel and transmit a primary PPDU in the primary operating channel to a non-AP STA that does not support SST or reception of A-PPDU without SST.

In various embodiments of the present disclosure, A-PPDU bandwidth rules shall be applied to all A-PPDU transmission regardless of whether SST is supported. As such, non-AP STAs may identify the lowest frequency of a received PPDU in an A-PPPDU through the bandwidth indication.

Figure 7:
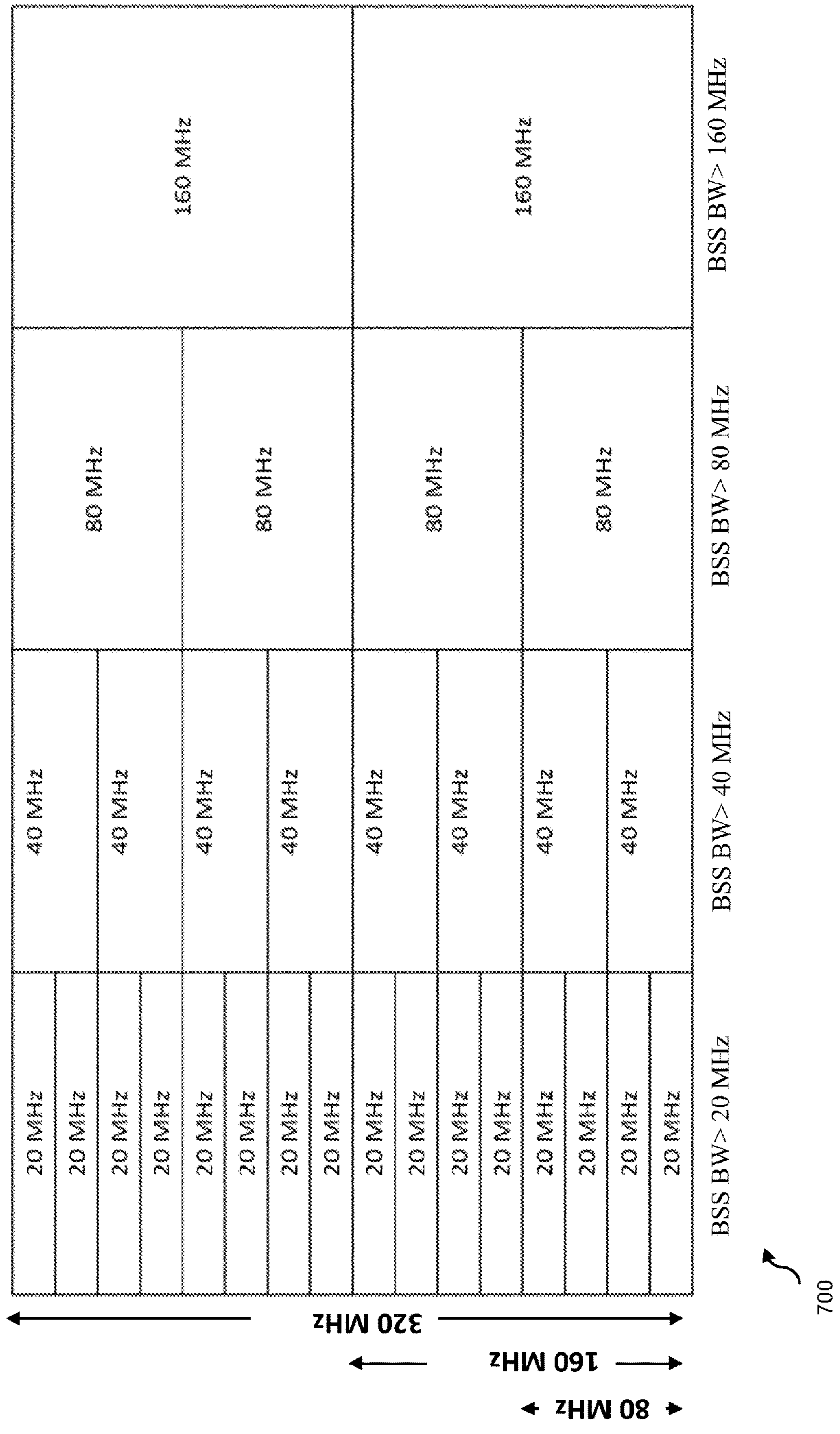
FIG. 7 depicts a table illustrating allowed bandwidths allocations of a non-HE (high efficiency) PPDU in an A-PPDU.

According to 802.11ax PPDU bandwidth rules, a 20/40/80/160 MHz HE PPDU shall be transmitted in the primary 20/40/80/160 MHz channel. FIG. 7 depicts a table 700 illustrating allowed bandwidths allocations of a non-HE (high efficiency) PPDU in an A-PPDU. In particular:

- when an HE PPDU and a 20 MHz PPDU of other amendments in an A-PPDU is transmitted, the 20 MHz PPDU of other amendments may be transmitted in any 20 MHz excluding the primary 20 MHz within a BSS bandwidth larger than 20 MHz;
- when an HE PPDU and a 40 MHz PPDU of other amendments in an A-PPDU is transmitted, the 40 MHz of other amendments may be transmitted in any half of any 80 MHz segment excluding the primary 40 MHz within a BSS bandwidth larger than 40 MHz.
- when an HE PPDU and an 80 MHz PPDU of other amendments in an A-PPDU is transmitted, the 80 MHz of other amendments may be transmitted in any 80 MHz segment excluding the primary 80 MHz within a BSS bandwidth larger than 80 MHz.
- when an HE PPDU and a 160 MHz PPDU of other amendments in an A-PPDU is transmitted, the 160 MHz of other amendments t may be transmitted in the secondary 160 MHz within a BSS bandwidth larger than 160 MHz.
- when an HE PPDU is not contained in an A-PPDU but a 20 MHz PPDU of other amendments in the A-PPDU is transmitted, the 20 MHz PPDU of other amendments may be transmitted in any 20 MHz channel within a BSS bandwidth larger than 20 MHz;
- when an HE PPDU is not contained in an A-PPDU but a 40 MHz PPDU of other amendments in the A-PPDU is transmitted, the 40 MHz PPDU of other amendments may be transmitted in any half of any 80 MHz segment within a BSS bandwidth larger than 40 MHz;
- when an HE PPDU is not contained in an A-PPDU but an 80 MHz PPDU of other amendments in the A-PPDU is transmitted, the 80 MHz PPDU of other amendments may be transmitted in any 80 MHz segment within a BSS bandwidth larger than 80 MHz; and
- when an HE PPDU is not contained in an A-PPDU but a 160 MHz PPDU of other amendments in the A-PPDU is transmitted, the 160 MHz PPDU of other amendments may be transmitted in the primary/secondary 160 MHz within a BSS bandwidth larger than 160 MHz.

Figure 8:
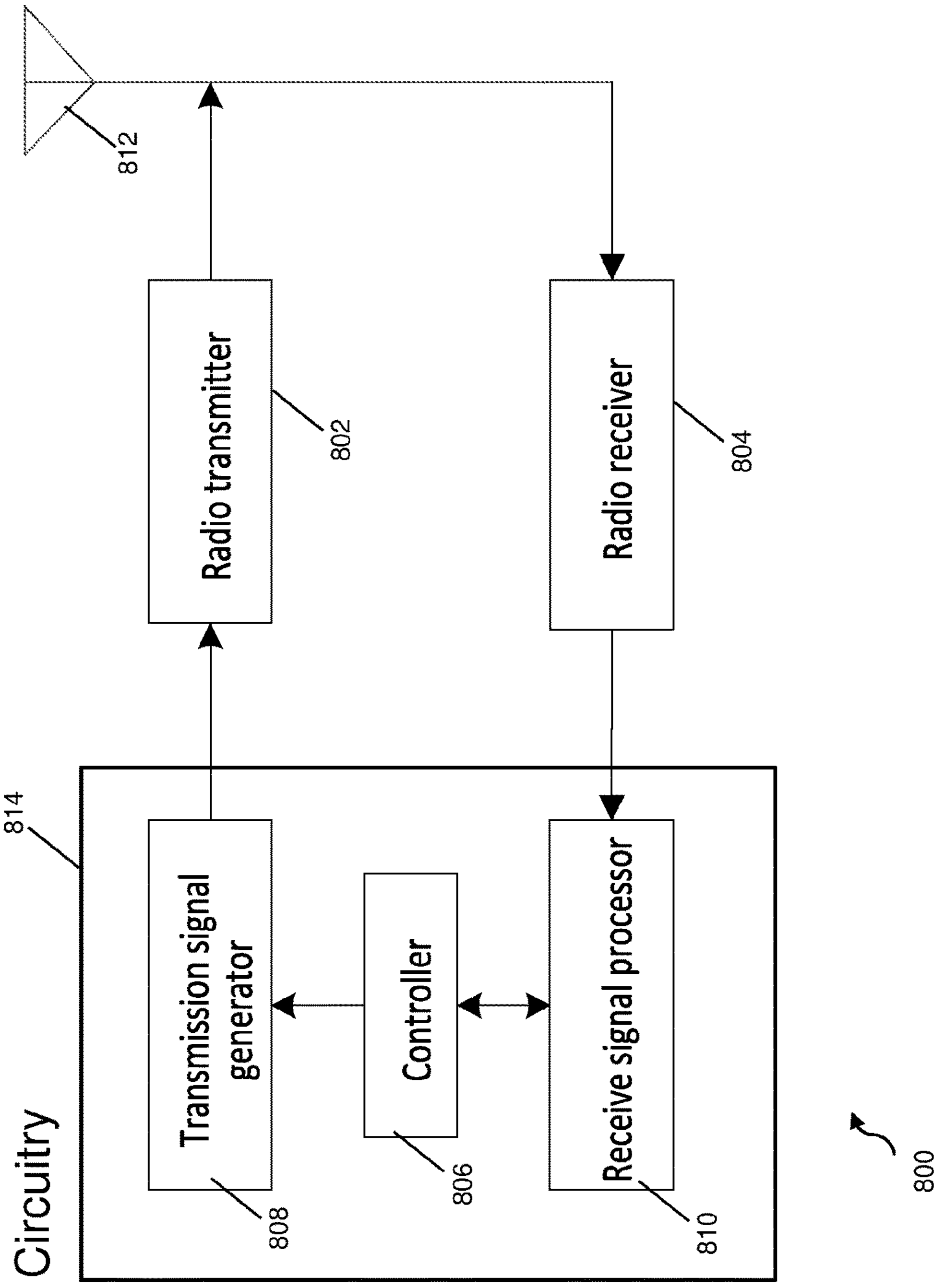
FIG. 8 depicts a schematic diagram illustrating an example configuration of a communication apparatus in accordance with the present disclosure.

FIG. 8 depicts a schematic diagram illustrating an example configuration of a communication apparatus 800 in accordance with the present disclosure. The communication apparatus 800 may be implemented as an AP and a STA and configured for transmitting and/or receiving an aggregated signal in accordance with the present disclosure. As shown in FIG. 8, the communication apparatus 800 may include circuitry 814, at least one radio transmitter 802, at least one radio receiver 804, and at least one antenna 812 (for the sake of simplicity, only one antenna is depicted in FIG. 8 for illustration purposes). The circuitry 814 may include at least one controller 806 for use in software and hardware aided execution of tasks that the at least one controller 806 is designed to perform, including control of communications with one or more other communication apparatuses in a multiple input and multiple output (MIMO) wireless network. The circuitry 814 may furthermore include at least one transmission signal generator 808 and at least one receive signal processor 810. The at least one controller 806 may control the at least one transmission signal generator 808 for generating MAC frames (for example Data frames, Management frame and Action frames) to be sent through the at least one radio transmitter 802 and the at least one receive signal processors 810 for processing MAC frames (for example Data frames, Management frame and Action frames) received through the at least one radio receiver 804 from the one or more other communication apparatuses. The at least one transmission signal generator 808 and the at least one receive signal processor 810 may be stand-alone modules of the communication apparatus 800 that communicate with the at least one controller 806 for the above-mentioned functions, as shown in FIG. 8. Alternatively, the at least one transmission signal generator 808 and the at least one receive signal processor 810 may be included in the at least one controller 806. It is appreciable to those skilled in the art that the arrangement of these functional modules is flexible and may vary depending on the practical needs and/or requirements. The data processing, storage and other relevant control apparatus can be provided on an appropriate circuit board and/or in chipsets. In various embodiments, when in operation, the at least one radio transmitter 802, at least one radio receiver 804, and at least one antenna 812 may be controlled by the at least one controller 806.

The communication apparatus 800, when in operation, provides functions required for transmitting and/or receiving an aggregated signal. For example, the communication apparatus 800 may be an AP, and the circuitry 814 (for example the at least one transmission signal generator 808 of the circuitry 814) may, in operation, is configured to indicate one or more operating channels of a plurality of operating channels to a group of associated STAs in which a signal allocated to the group of associated STAs will be transmitted, and generate a signal allocated to the group of associated STAs and another signal(s) allocated to another group(s) of associated STAs. The ratio transmitter 802 may, in operation, transmits an aggregated signal comprising the signal and the other signal(s) simultaneously.

In one embodiment, the circuitry 814 (for example the at least one transmission signal generator 808 of the circuitry 814) may be configured to further indicate a signal pattern of the aggregated signal. In another embodiment, the circuitry 814 (for example the at least one transmission signal generator 808 of the circuitry 814) may be configured to further indicate a plurality of allowed signal patterns of the aggregated signal. Yet in another embodiment, the circuitry 814 (for example the at least one transmission signal generator 808 of the circuitry 814) may be configured to further generate the aggregated signal to further comprises a signal field indicating a presence of the signal or a resource unit allocated to the group of associated STAs.

The circuitry 814 (for example the at least one transmission signal generator 808 of the circuitry 814) may be configured to generate a frame to indicate the one or more operating channels, and the ratio transmitter 802 transmits the frame prior to transmitting the aggregated signal.

The radio receiver 804 may, in operation, receive a feedback signal from the group of associated STAs, and the circuitry 814 (for example the at least one receive signal processor 810 of the circuitry 814) may be configured to determine whether to generate the secondary signal based on the received feedback signal.

For example, the communication apparatus 800 may be a STA of a group of STAs associated to an AP and the radio receiver 804 may, in operation, receives, from the AP, information relating to one or more operating channels of a plurality of operating channels in which a signal allocated to the group of associated communication apparatuses will be transmitted, and an aggregated signal comprising a signal allocated to the group of associated STAs and another signal(s) allocated to another group(s) of associated STAs simultaneously. The circuitry (for example the at least one receive signal processor 810 of the circuitry 814) may, in operation, decode the aggregated signal.

In one embodiment, the circuitry (for example the at least one receive signal processor 810 of the circuitry 814) is configured to decode the aggregated signal comprising the signal allocated to the group of associated STAs transmitted in a primary operating channel only when the one or more operating channel comprising the primary operating channel configured for the group of STAs is different from that of other group(s) of the associated STAs.

In another embodiment, the circuitry (for example the at least one receive signal processor 810 of the circuitry 814) is configured to decode the aggregated signal comprising a primary signal allocated to both the group and the other group(s) of associated communication apparatuses in a primary operating channel and a secondary signal allocated to the group of associated communication apparatuses in one or more secondary operating channels simultaneously when the one or more operating channels comprises the primary operating channel that was previously indicated during an association phase between the AP and the associated STA and is shared among both the group and the other group(s) of associated STAs and the one or more secondary operating channels which does not overlap the primary operating channel.

The radio receiver 804 may receive a frame indicating the one or more operating channels and the circuitry (for example the at least one receive signal processor 810 of the circuitry 814) is configured to process the frame prior to decoding the aggregated signal.

The circuitry (for example the at least one transmission signal generator 808 of the circuitry 814) is configured to generate a feedback signal to the AP to indicate whether to generate the secondary signal prior to receiving the aggregated signal and the radio transmitter 802 may, in operation, transmits the feedback signal to the AP.

The circuitry 814 (for example the at least one receive signal processor 810 of the circuitry 814) is configured to determine if the aggregated signal comprises the signal allocated to the associated communication apparatus based on a signal field of the aggregated signal indicating a presence of the signal and a resource unit allocated to the group of STAs.

The circuitry 814 (for example the at least one receive signal processor 810 of the circuitry 814) is configured to stop decoding other signal(s) of the aggregated signal once the signal allocated to the communication apparatus 800 has been decoded.

Figure 9:
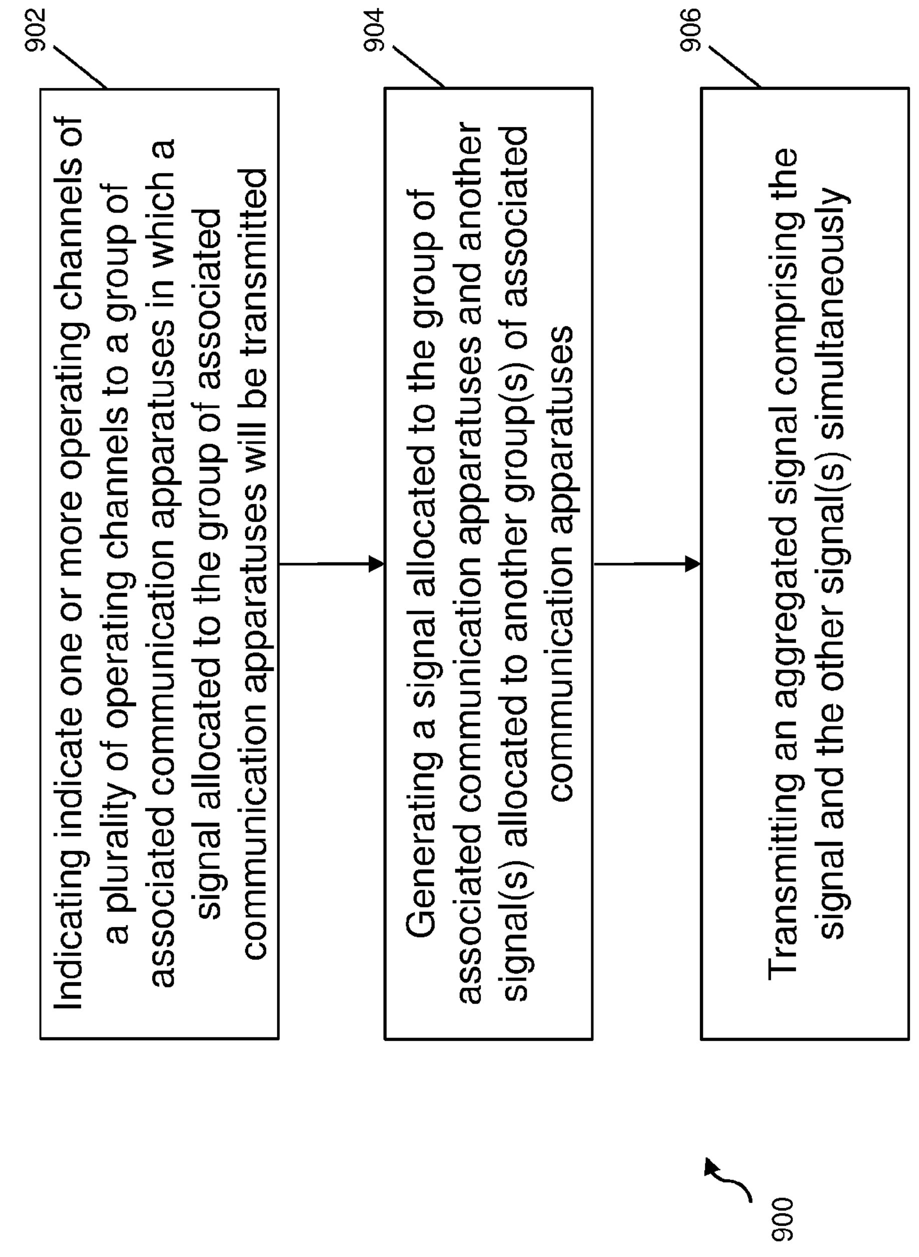
FIG. 9 depicts a flow chart illustrating a communication method for A-PPDU transmission according to various embodiments of the present disclosure.

FIG. 9 depicts a flow chart 900 illustrating a communication method for A-PPDU transmission according to various embodiments of the present disclosure. In step 902, a step of indicating one or more operating channels of a plurality of operating channels to a group of associated communication apparatuses in which a signal allocated to the group of associated communication apparatuses will be transmitted. In step 904, a step of generating a signal allocated to the group of associated communication apparatuses and another signal(s) allocated to another group(s) of associated communication apparatuses is carried out. In step 906, a step of transmitting an aggregated signal comprising the signal and the other signal(s) is carried out simultaneously.

In the following paragraphs, a first embodiment of the present disclosure which relates to DL A-PPDU transmission using static A-PPDU is explained. Under this type of DL A-PPDU transmission, only specific signal patterns are allowed within a TXOP/duration. A-PPDU information (e.g. A-PPDU parameters) about signal patterns and limitations on A-PPDU transmission within the TXOP/duration are indicated to a group of intended non-AP STAs prior to DL A-PPDU transmission. Examples of a signal pattern or limitation include combination of amendments, allowed bandwidth of a PPDU and allowed position of a PPDU. One or more sec-primary operating channels may also be indicated to the non-AP STAs. Such sec-primary operation channels are not overlapped by a secondary PPDU and, similar to the primary operating channel, shall be listened to by the group of intended non-AP STAs. The sec-primary operation channel(s) shall not be punctured when there is a secondary PPDU. Under static A-PPDU transmission, A-PPDU patterns that are not indicated are not allowed within the TXOP/duration.

Figure 10:
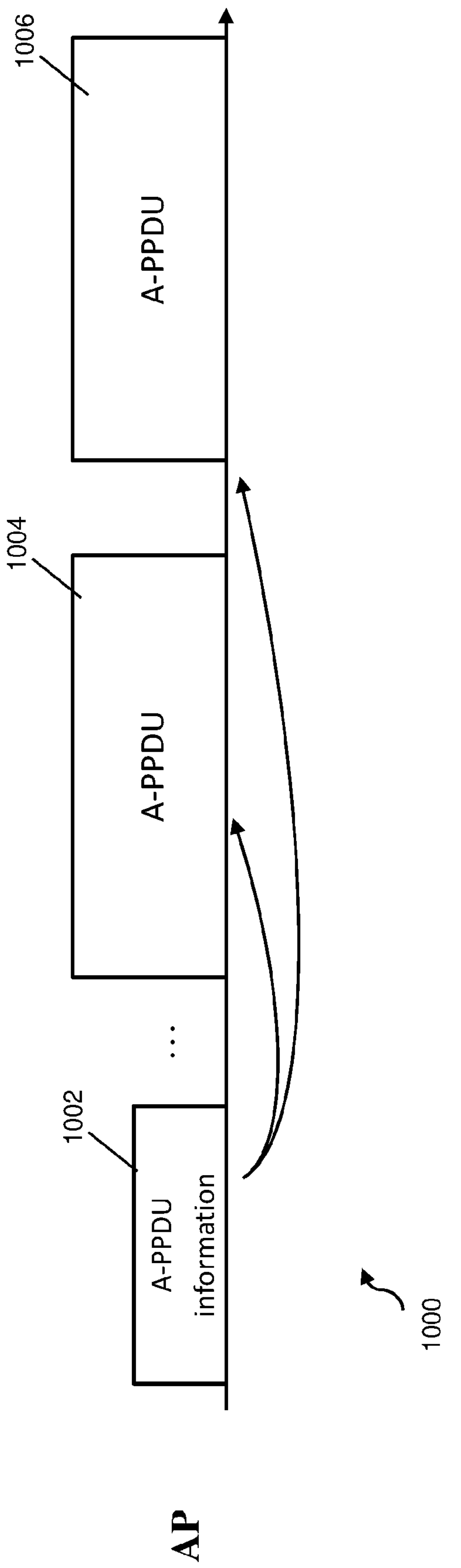
FIG. 10 depicts a flow diagram illustrating an A-PPDU transmission according to an example of the first embodiment of the present disclosure.

The A-PPDU information may be broadcasted using a management frame (a MAC (media access control) frame) before A-PPDU transmission. FIG. 10 depicts a flow diagram 1000 illustrating an A-PPDU transmission according to an example of the first embodiment of the present disclosure. The AP may transmit a management frame 1002 carrying information about a signal pattern or limitation on A-PPDU transmission within the TXOP/duration prior to a transmission of A-PPDUs 1004, 1006 of the same pattern within the TXOP/duration. Examples of a management frame includes Beacon frame, Probe Response frame, multi-user Request-To-Send (MU-RTS) trigger frame, null data packet (NDP) Feedback Report Poll (NRFP) Trigger frame.

Figure 11:
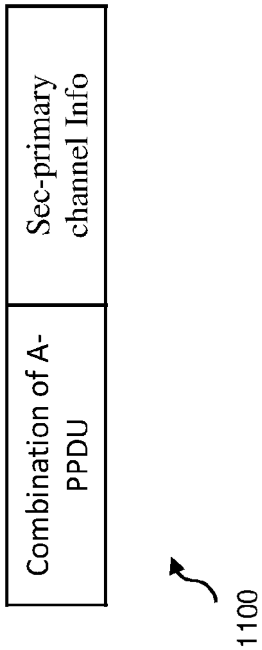
FIG. 11 depicts an example format of an A-PPDU element carried in a Beacon frame or Probe Response frame.

FIG. 11 depicts an example format of an A-PPDU element 1100 carried in a Beacon frame or Probe Response frame. The A-PPDU element 1100 comprises a Combination of A-PPDU field and a Sec-primary Channel Info field. The Combination of A-PPDU field may comprise information about allowed amendments and/or maximal number of PPDUs contained in an A-PPDU. The Sec-primary Channel Info field may comprise information about a channel number of a sec-primary channel(s). It is noted that Beacon frame is transmitted periodically by an AP to announce the information about the network, the broadcasted information is valid through a Beacon Interval (which may be larger than a TXOP).

Figure 12:
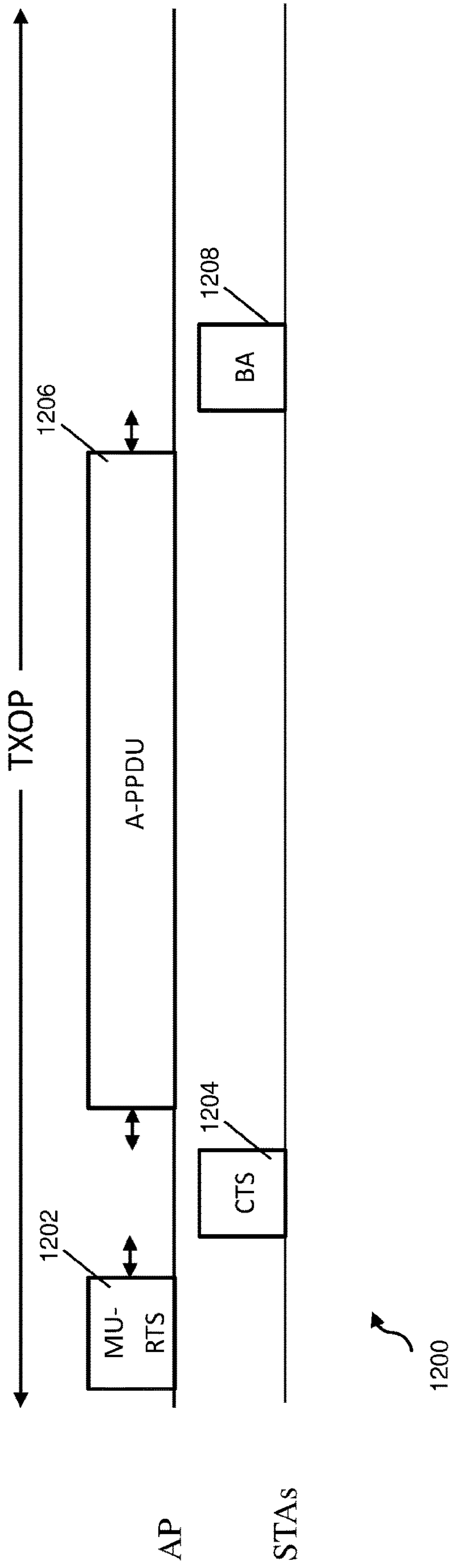
FIG. 12 depicts a flow diagram illustrating an A-PPDU transmission according to another example of the first embodiment of the present disclosure.

FIG. 12 depicts a flow diagram 1200 illustrating an A-PPDU transmission according to another example of the first of the present disclosure. The AP may transmit a MU-RTS trigger frame 1202 carrying a signal pattern or limitation on A-PPDU transmission within the TXOP/duration to STAs. It is noted that a MU-RTS trigger frame is usually transmitted at the beginning of a TXOP to set a network allocation vector (NAV) protection, the broadcasted information is valid through the TXOP. The STAs, which receives the trigger frame 1202, will transmit a feedback signal 1204 (e.g. Clear-to-send (CTS) signal) back to the AP. Subsequently, within the TXOP/duration, the AP transmit an A-PPDU 1206 comprising a signal allocated to the STAs. The STAs, which receives and decodes the signal, will then transmit a BlockAck frame 1208 back to AP.

The MU-RTS trigger frame 1202 can be a reused and modified from the current standard which comprises a Frame Control field, a Duration field, a Recipient Address (RA) field, a Transmitter Address (TA) field, a Common Info field, one or more User Info field, a Padding field and a Frame Check Sequence (FCS) field. The Frame Control field, Duration field, RA field and TA field may be grouped as a MAC header. The Common Info field comprises a Trigger Type subfield, a More Trigger Frame (TF) subfield, a CS Required subfield, a UL Bandwidth (BW) subfield, a Guard Interval (GI) and Long Training Field (LTF) Type subfield, a LDPC Extra Symbol Segment, AP Tx Power subfield, Pre-FEC Padding Factor subfield, Packet Extension (PE) Disambiguity subfield, UL Spatial Reuse subfield, Doppler subfield and UL HE-SIG-A2 Reserved subfield.

Figure 13:
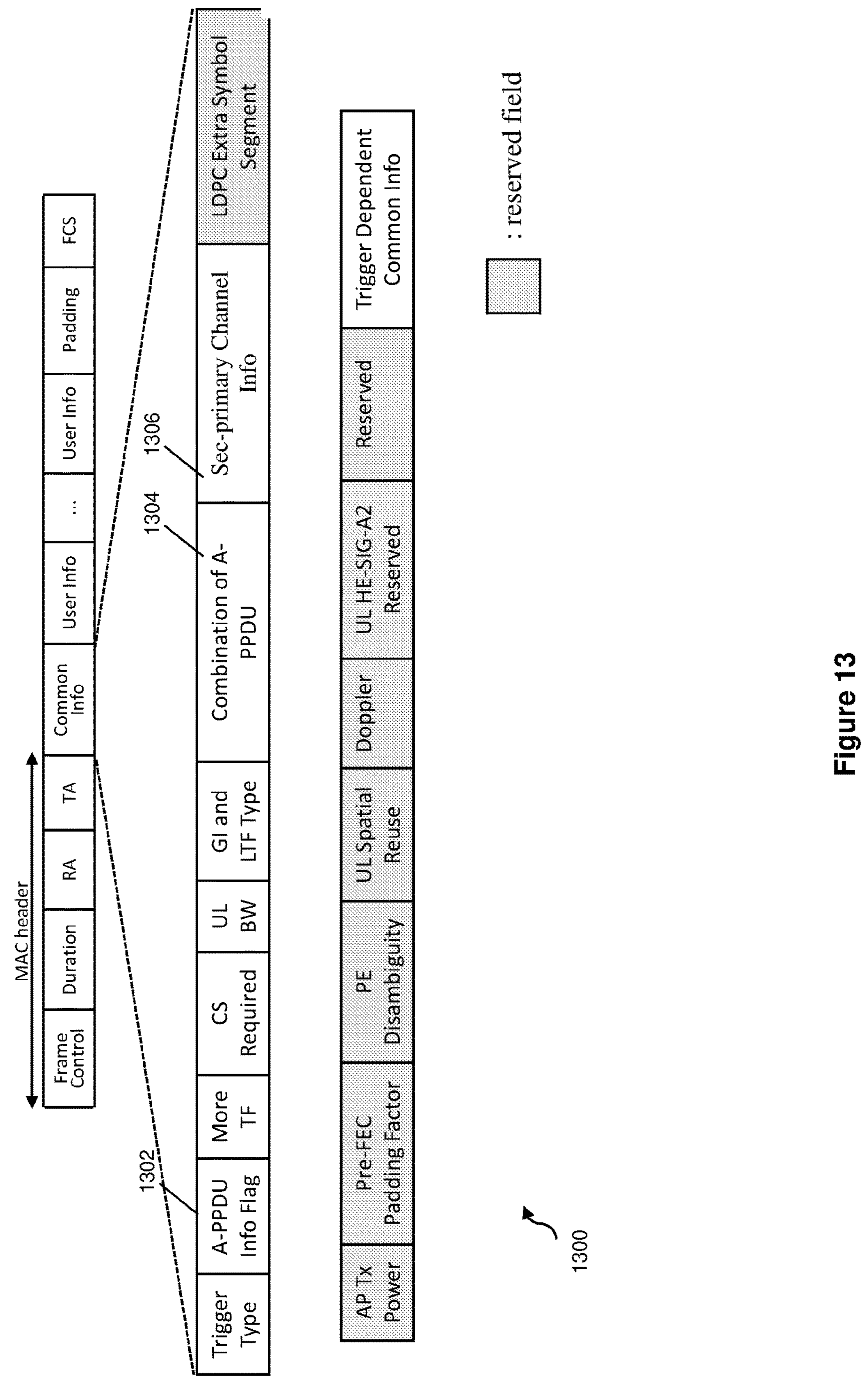
FIGS. 13 and 14 each depicts an example format of MU-RTS trigger frame.
Figure 14:
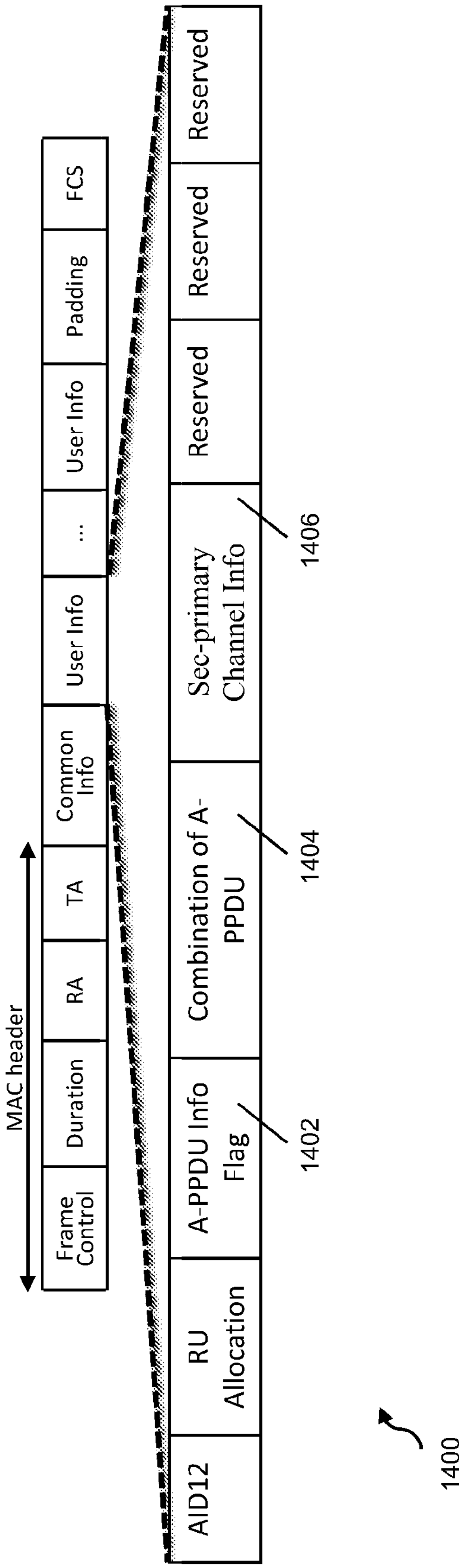

FIGS. 13 and 14 each depicts an example format of MU-RTS trigger frame 1202. In one example, the UL Length, MU-MIMO HE-LTF Mode, Number Of HE-LTF Symbols And Midamble Periodicity, UL STBC, LDPC Extra Symbol Segment. AP Tx Power, Pre-FEC Padding Factor, PE Disambiguity, UL Spatial Reuse, Doppler and UL HE-SIG-A2 Reserved subfields in the Common Info field of MU-RTS Trigger frame are reserved, and some of reserved fields 1302, 1304, 1306 are reused and form an A-PPDU Info Flag subfield 1302, a Combination of A-PPDU subfield 1304 and Sec-primary Channel Info field 1306 respectively. The A-PPDU Info Flag subfield 1302 indicates a presence of A-PPDU information related fields. The Combination of A-PPDU subfield 1304 indicates the A-PPDU information. The Sec-primary Channel Info field 1306 may indicate a channel number of a sec-primary channel(s).

In another example, as illustrated in FIG. 14, the UL HE-MCS. UL FEC Coding Type, UL DCM, SS Allocation/RA-RU Information and UL Target Receive Power fields in the User Info field are reserved while some of reserved fields are reused to form an A-PPDU Info Flag subfield 1402, a Combination of A-PPDU subfield 1404 and Sec-primary Channel Info field 1406. Similarly, the A-PPDU Info Flag subfield 1402 indicates a presence of A-PPDU information related fields. The Combination of A-PPDU subfield 1404 indicates the A-PPDU information. The Sec-primary Channel Info field 1406 may indicate a channel number of a sec-primary channel(s).

Figure 15:
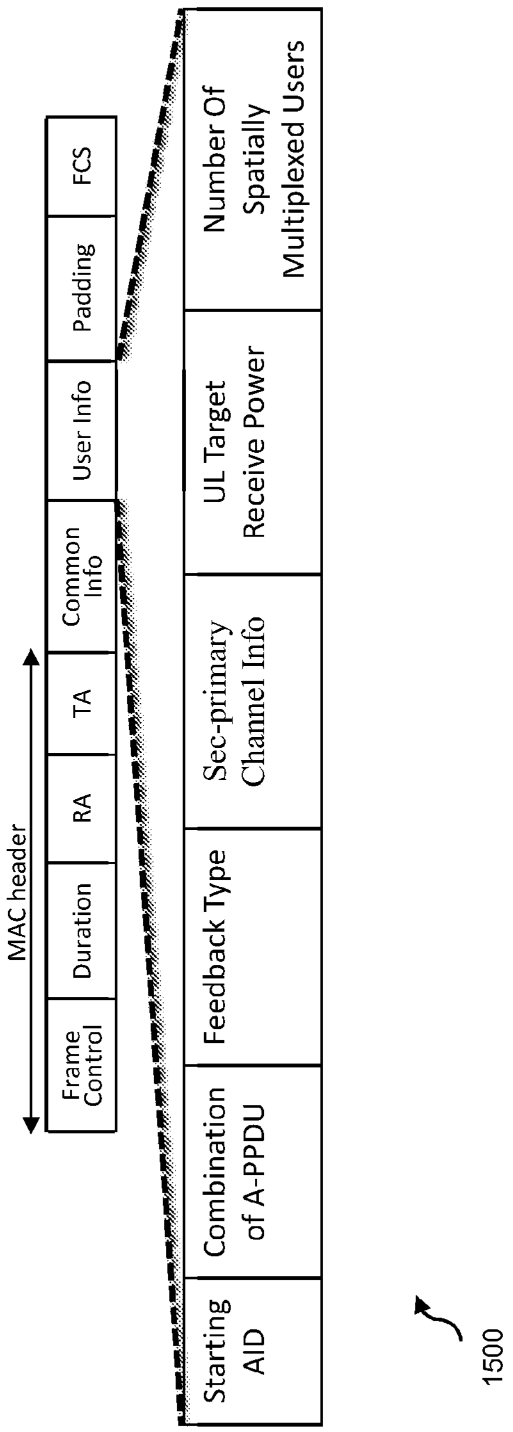
FIG. 15 depicts an example format of NRFP trigger frame.

The NRFP trigger frame can be a reused and modified from the current standard which comprises a Frame Control field, a Duration field, a RA field, a TA field, a Common Info field, a User Info field, a Padding field and a FCS field. The Frame Control field, Duration field, RA field and TA field may be grouped as a MAC header. The User Info field comprises a Starting AID field, Feedback Type field, an uplink (UL) Target Receive Power field and a Number of Spatially Multiplexed Users field as well as two reserved fields (9-bits and 7-bits). FIG. 15 depicts an example format of NRFP trigger frame 1500. The two reserved fields in the User Info field are reused and form a Combination of A-PPDU field and a Sec-primary Channel Info field where the Combination of A-PPDU subfield indicates the A-PPDU information and the Sec-primary Channel Info field may indicate a channel number of a sec-primary channel(s). The value of '1' in Feedback Type field, which is reserved in 802.11ax, is used to indicate "A-PPDU support feedback request". It is noted that the A-PPDU information broadcasted by a NFRP Trigger frame is valid through the TXOP/duration.

Upon receipt of the NFRP Trigger frame 1500 by the non-AP STAs, the solicited non-AP STAs shall feedback whether they support the indicated A-PPDU in the TXOP/duration by reusing the RU_TONE_SET_INDEX for FEEDBACK_STATUS bit in an NDP feedback report response.

According to the present disclosure, static A-PPDU transmission by an AP is implemented along with parallel decoding by non-AP STAs. Non-AP STAs listen to and decode the primary channel and the indicated sec-primary channel(s) in parallel or simultaneously. Upon receipt of a PPDU from the AP, non-AP STAs will determine if a received PPDU is an A-PPDU through at least one of two options: (1) by determining whether a valid secondary PPDU signal is detected and (2) the decoding result of RU allocation in PPDU(s).

An example of a determination of a detection of a valid secondary PPDU signal and an A-PPDU includes a non-AP STA detects an HE PPDU in the primary 40 MHz channel and an EHT PPDU in the third 40 MHz channel. Under this option, the receiver non-AP STA of a group of non-AP STAs needs to decode until HE-SIG-A/U-SIG field to check PHY Version identifier (ID), bandwidth and BSS color. The receiver non-AP STA stops decoding on the primary PPDU once a valid secondary PPDU signal that is out of the primary PPDU's bandwidth is detected. If more than one valid secondary PPDU is detected, the receiver non-AP STA keeps decoding on the PPDU in higher frequency. Under this option, the AP shall not transmit data in a primary PPDU of an A-PPDU to those STAs who listen to the primary channel and other subchannel(s) simultaneously.

Figure 16A:
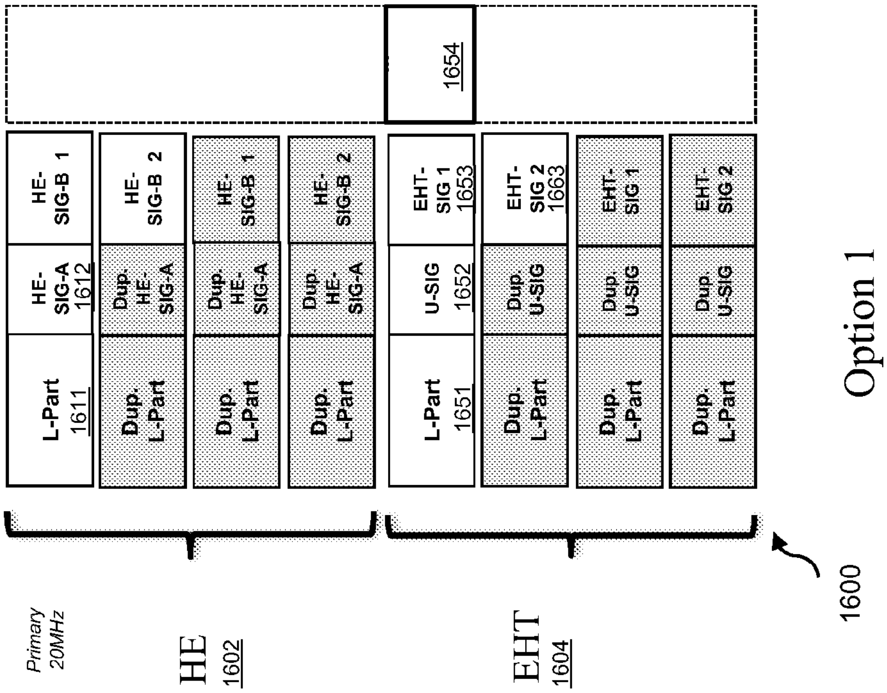
FIG. 16A depicts an A-PPDU transmitted to a non-AP STA according to an example of the first embodiment of the present disclosure.

FIG. 16A depicts an A-PPDU 1600 transmitted to a non-AP STA according to an example of the first embodiment of the present disclosure. The A-PPDU 1600 comprises an HE PPDU 1602 transmitted in the first and second 40 MHz channel (P40 and S40) and an EHT PPDU 1604 transmitted in the third and fourth 40 MHz channel (T40 and F40). In this example, under the first embodiment Option 1, the receiver non-AP STA may decode from L-parts until HE-SIG-A field and U-SIG field and, in this case, it detects there is a valid secondary PPDU signal allocated to it at the T40 (third 40 MHz channel). The non-AP STA then stops decoding the primary PPDU and continue the secondary PPDU including EHT-SIG field 1 1653 and EHT-SIG field 2 1663 in the T40. After decoding the A-PPDU preamble, the non-AP STA then finds its allocated data in the data field 1654 in the T40. In this example, assuming duplicated fields at higher frequency segment may not be decoded after decoding the corresponding fields at the lower frequency segment, the minimum required portion for decoding the A-PPDU 1600 includes the L-Part 1611 and HE-SIG-A field 1612 of the HE PPDU 1602 in the primary 40 MHz channel, and the L-Part 1651. U-SIG field 1652, EHT-SIG field 1 1653. EHT-SIG field 2 1663 and Data field 1654 of the EHT PPDU 1604 in the T40.

Regarding Option 2, the decoding result of RU allocation in the received PPDU may be determined when the non-AP STA decodes a RU allocation field in HE-SIG-B/EHT-SIG field. Hence, under this option, the non-AP STA needs to decode until the RU allocation field in HE-SIG-B/EHT-SIG field and stop decoding once it finds its allocated RU. Under this option, the AP may send data in a primary PPDU of an A-PPDU to those non-AP STAs who listen to primary and sec-primary subchannel simultaneously.

Figure 16B:
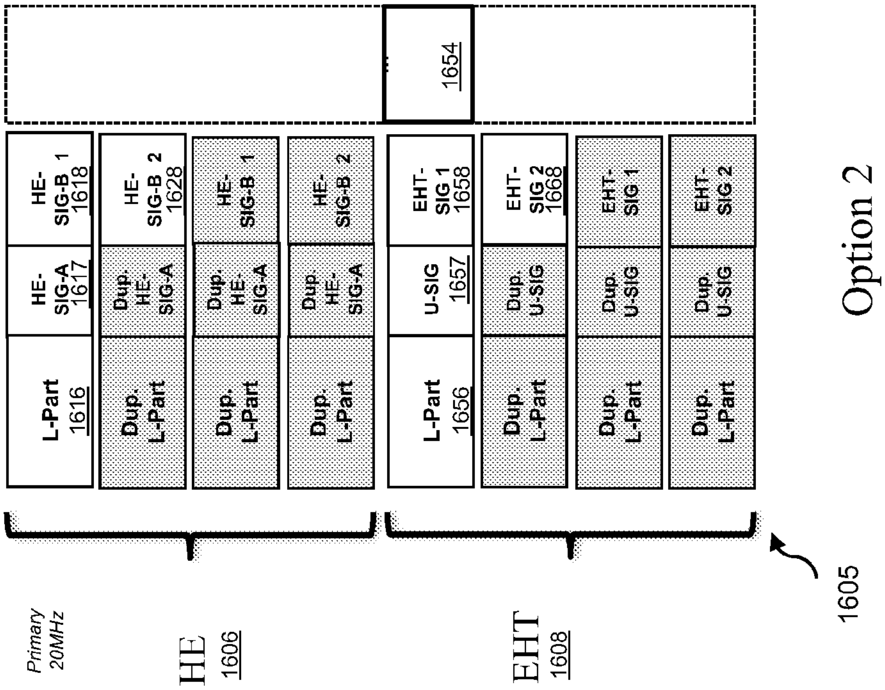
FIG. 16B depicts an A-PPDU transmitted to a non-AP STA according to another example of the first embodiment of the present disclosure.

FIG. 16B depicts an A-PPDU 1605 transmitted to a non-AP STA according to another example of the first embodiment of the present disclosure. The A-PPDU 1605 comprises an HE PPDU 1606 transmitted in the first and second 40 MHz channel (P40 and S40) and an EHT PPDU 1608 transmitted in the third and fourth 40 MHz channel (T40 and F40). In this example, under first embodiment Option 2, the receiver non-AP STA may decode from L-parts until RU allocation fields in HE-SIG-B fields of HE PPDU 1602 and EHT-SIG fields of the EHT PPDU 1604 in parallel, in this case, it detects a RU allocated to it in the T40. The non-AP STA then stops decoding the preamble once it finds its allocated RU. After decoding the A-PPDU preamble, the non-AP STA then finds its allocated data in the data field 1654 in the T40. In this example, assuming duplicated fields at higher frequency segment may not be decoded after decoding the corresponding fields at the lower frequency segment, the minimum required portion for decoding the A-PPDU 1605 in this example includes the L-Part 1616, HE-SIG-A field 1617, HE-SIG-B field 1 1618 and HE-SIG-B 2 1628 of the HE PPDU 1606 in the P40, and the L-Part 1651, U-SIG field 1652, EHT-SIG field 1 1653, EHT-SIG field 2 1663 and Data field 1654 of the EHT PPDU 1604 in the T40.

In the case where the AP reuses Beacon/Probe Response frame or a MU-RTS Trigger frame to transmit A-PPDU information and indicate a sec-primary channel at the third 40 MHz channel prior to A-PPDU transmission, the AP assumes all non-AP STAs that support parallel decoding will listen to more than one channel. For example, STA's capabilities such as reception of A-PPDU without SST and maximal number of decoders may be known to the AP. On the other hand, a non-AP STA upon receipt of the frame will determine and decide whether to listen to additional sub-channels based on its operating bandwidth and capabilities.

In the case where the AP reuses a NFRP Trigger frame, a non-AP STA(s) will transmit a feedback signal upon receipt of the NFRP Trigger frame, and the AP will then determine and decides whether to transmit a secondary PPDU of an A-PPDU to the non-AP STA(s) based on the feedback.

Figure 17:
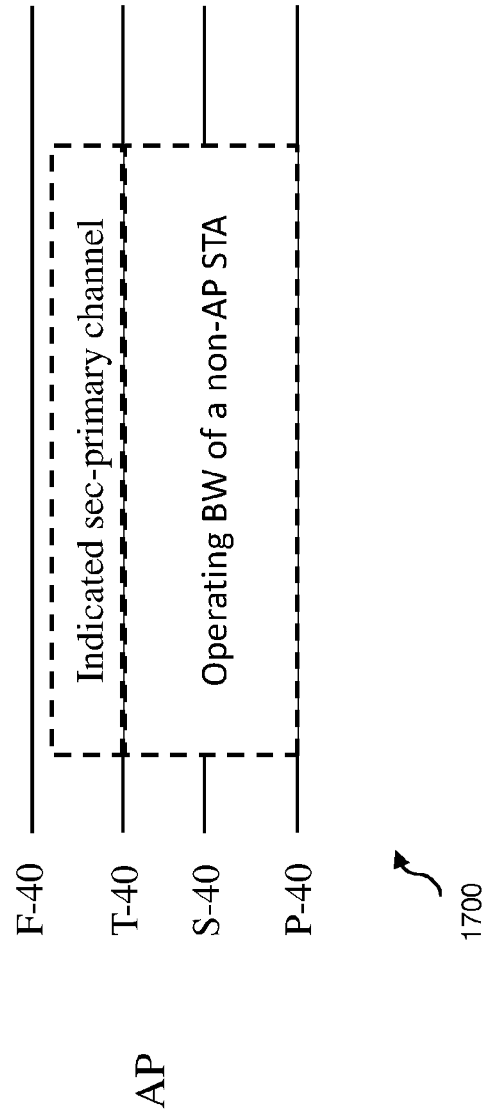
FIG. 17 depicts a schematic diagram illustrating an operating bandwidth of a non-AP STA and an indicated sec-primary channel according to the first embodiment of the present disclosure.

FIG. 17 depicts a schematic diagram 1700 illustrating an operating bandwidth of a non-AP STA and an indicated sec-primary channel according to the first embodiment of the present disclosure. In this example, the sec-primary channel is indicated as the lower 20 MHz of the third 40 MHz channel and the operating bandwidth of the non-AP STA is smaller than 80 MHZ. It is determined that the indicated sec-primary channel is out of its operating band-width and the non-AP STA will listen to the primary channel only and not to the additional channel. The AP will not send a PPDU that is not a primary PPDU of an A-PPDU to the non-AP STA.

The effect of parallel decoding is that an amount of decoders equals to the number of PPDUs are needed. There is no additional signaling required but with high decoding burden.

Figure 18:
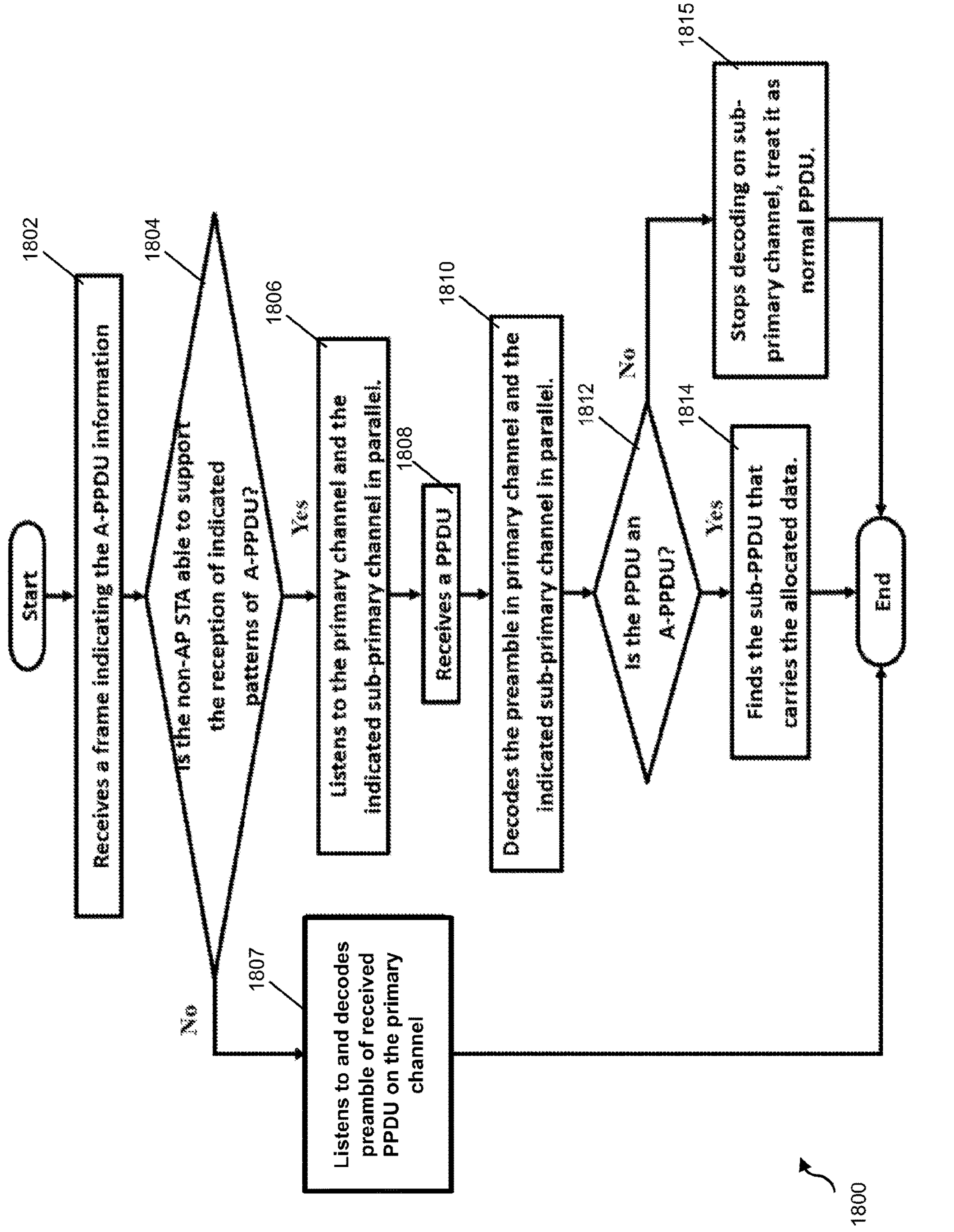
FIG. 18 depicts a flow chart illustrating a process for receiving an A-PPDU by a non-AP STA according to an example of the first embodiment of the present disclosure.

FIG. 18 depicts a flow chart 1800 illustrating a process for receiving an A-PPDU by a non-AP STA according to an example of the first embodiment of the present disclosure. In step 1802, a step of receiving a frame indicating A-PPDU information is carried out. In step 1804, a step of determining if the non-AP STA is able to support the reception of indicated patterns of A-PPDU in the A-PPDU information is carried out. If it is determined that the non-AP STA is able to support, step 1806 is carried out; otherwise step 1807 is carried out. In step 1806, a step of listening to the primary channel and the indicated sub-primary (or sec primary channel) in parallel is carried out. In step 1808, a step of receiving a PPDU is carried out. In step 1810, a step of decoding the preamble in the primary channel and the indicated sub-primary channel is parallel is carried out. In step 1812, a step of determining whether the received PPDU is an A-PPDU is carried out. If it is determined that it is an A-PPDU, step 1814 is carried out; otherwise step 1815 is carried out. In step 1814, a step of finding the sub-PPDU (secondary PPDU) that carries the allocated data is carried out, and the process may end.

In step 1807, after it is determined that the non-AP STA is not able to support the reception of indicated patterns of A-PPDU, a step of listening to and decoding the preamble of received PPDU on the primary channel is carried out, and the process may end. In step 1815, after it is determined that the received PPDU is not an A-PPDU, a step of treating the PPDU as a normal PPDU and stop decoding on sub-primary channel is carried out, and the process may end.

According to the present disclosure, static A-PPDU transmission by an AP is implemented along with restriction on current specification where each non-AP STA listens to a single 20 MHz channel indicated by the AP. This is achieved through at least one of the two options: (1) by assigning different primary operating channels for different groups of non-AP STAs, and (2) each groups of non-AP STAs may have more than one primary operating channel.

Under the Option 1 where different groups of non-AP STAs have different primary channels, the AP indicates different operating primary channels to different groups of non-AP STAs. The indicated primary operating channel should be consistent with the indicated A-PPDU pattern. On the other hand, each group of non-AP STAs only listen to the indicated primary channel during the life of the BSS. The AP sends frame including Beacon and group addressed frames overlapping the corresponding primary/sec-primary channel to each group of non-AP STAs.

Figure 19:
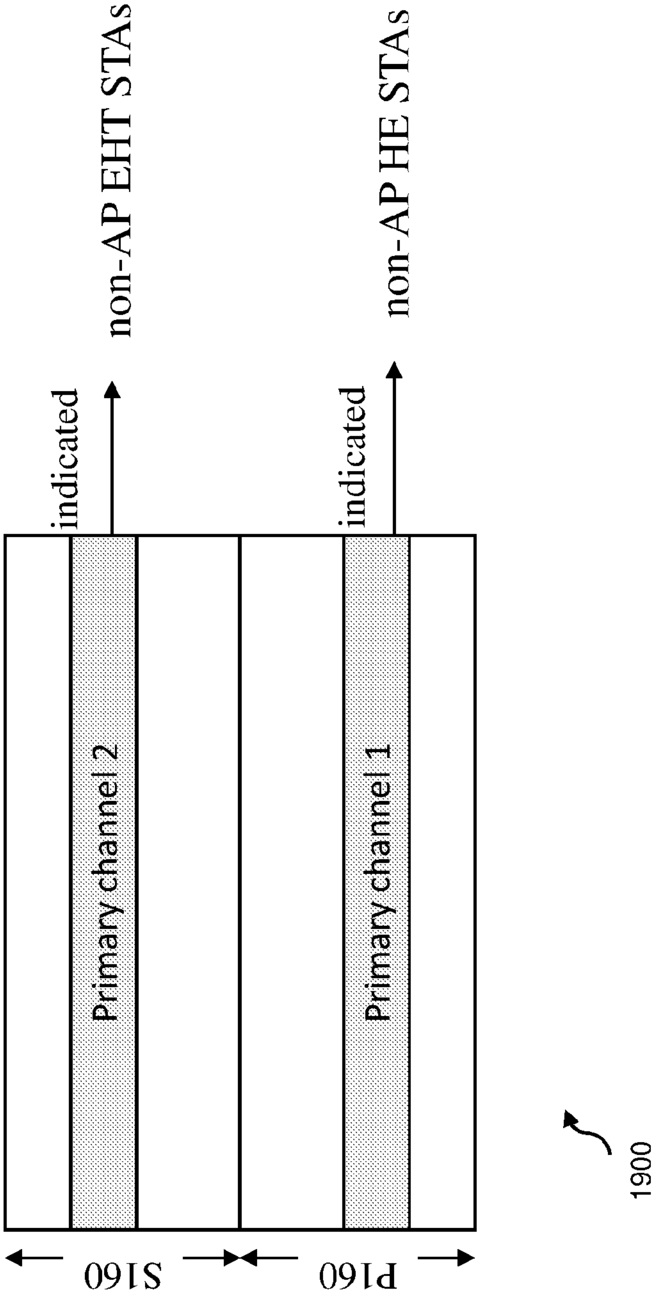
FIG. 19 depicts a schematic diagram illustrating an example channel configuration for two different groups of non-AP STAs.

FIG. 19 depicts a schematic diagram 1900 illustrating an example channel configuration for two different groups of non-AP STAs. In this example, the groups are divided according to amendments into non-AP HE STAs and non-AP EHT STAs. An A-PPDU pattern of an HE PPDU in primary 160 MHz channel (P160) and an EHT PPDU in secondary 160 MHz channel (S160) is indicated. The AP may indicate two primary channels to non-AP HE STAs and EHT STAs in P160 and S160 respectively. As illustrated in FIG. 19, the non-AP HE STAs only listen to the primary channel 1 and non-AP EHT STAs only listen to the primary channel 2.

Regarding Option 2, where each group of non-AP STAs may have more than one primary operating channel and groups may be divided by amendment, the AP may indicate to the primary operating channel (common to all groups of STAs) and one sec-primary channel to each group of non-AP STAs (e.g. non-AP post-HE STAs) such that each group of non-AP STAs are aware of one primary operating channel and one sec-primary channels. The sec-primary channel of each group of non-AP STAs should be consistent with the indicated A-PPDU pattern. As such, each group of post-HE non-AP STAS only listen to the indicated sec-primary channel but may switch to primary channel to receive regular PPSUs and then back to the sec-primary channel again. The AP shall indicate the time duration of listening to the sec-primary channel (i.e., switching interval) together with the sec-primary channel information. The AP sends an A-PPDU consisting of PPDUs overlapping the corresponding primary/sec-primary channel to each group of non-AP STAs.

Figure 20:
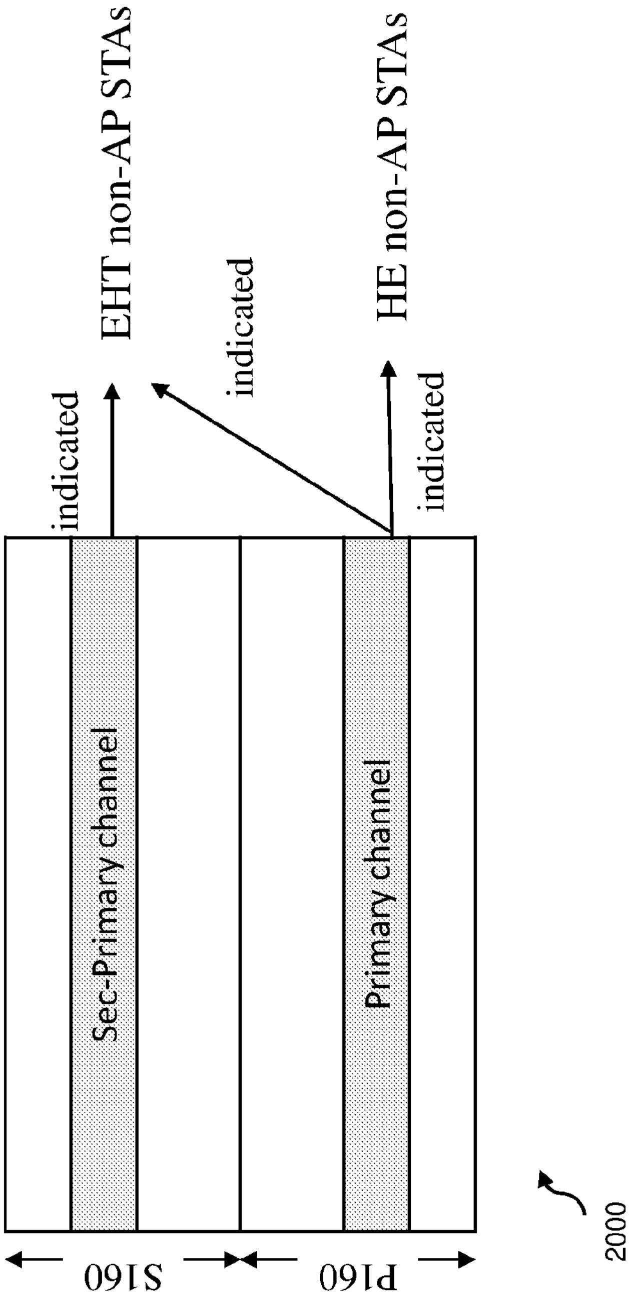
FIG. 20 depicts a schematic diagram illustrating another example channel configuration for two different groups of non-AP STAs.

FIG. 20 depicts a schematic diagram 2000 illustrating another example channel configuration for two different groups of non-AP STAs. In this example, the groups are divided according to amendments into non-AP HE STAs and non-AP EHT STAs. An A-PPDU pattern of an HE PPDU in primary 160 MHz channel (P160) and an EHT PPDU in secondary 160 MHz channel (S160) is indicated. The AP may indicate the primary channel to non-AP HE STAs and EHT STAs in P160 while an additional sec-primary channel to non-AP EHT STAs. As illustrated in FIG. 20, non-AP HE STAs only listen to the primary channel while non-AP EHT STAs only listen to the sec-primary channel. However, EHT non-AP STAs are still aware of the position of the primary channel and able to switch back to it when necessary.

Figure 21:
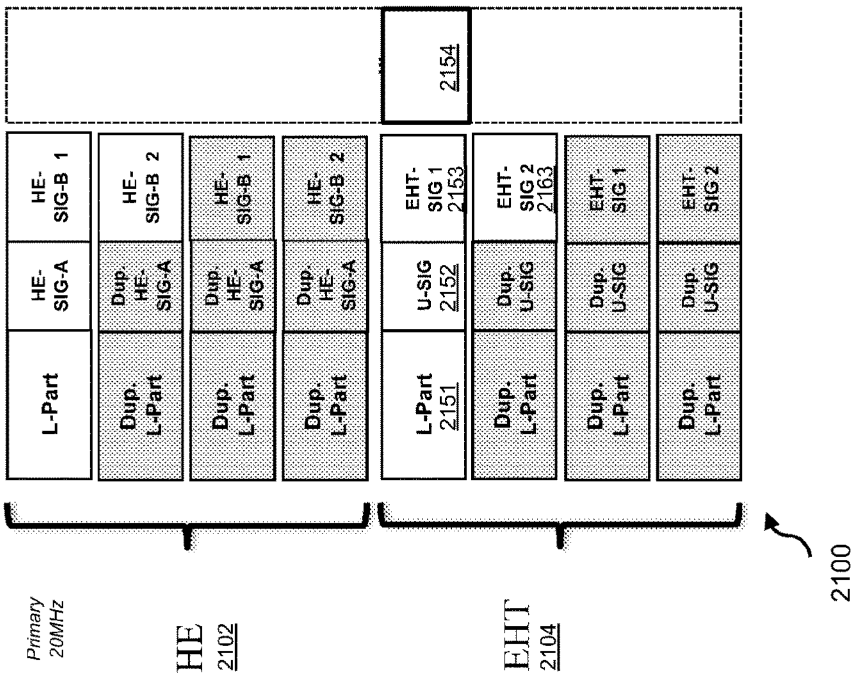
FIG. 21 depicts an A-PPDU transmitted to a non-AP STA according to yet another example of the first embodiment of the present disclosure.

FIG. 21 depicts an A-PPDU 2100 transmitted to a non-AP STA according to yet another example of the first embodiment of the present disclosure. The A-PPDU comprises an HE PPDU 2102 transmitted in the first and second 40 MHz channel (P40 and S40) and an EHT PPDU 2104 transmitted in the third and fourth 40 MHz channel (T40 and F40). In this example, a primary operating channel (or a sec-primary operating channel in which the non-AP STA is primarily operating in) of T40 is allocated to the non-AP STA, and therefore the non-AP STA only listens to the T40. In this example, the non-AP STA may decode from EHT PPDU transmitted in the T40 and finds its allocated data in the data field 2154 in the T40. In this example, assuming duplicated fields at higher frequency segment may not be decoded after decoding the corresponding fields at the lower frequency segment, the minimum required portion for decoding the A-PPDU 2100 in this example includes the L-Part 2151, U-SIG field 2152, EHT-SIG field 1 2153, EHT-SIG field 2 2163 and Data field 2154 of the EHT PPDU 2104 in the T40. Advantageously, this results in a same decoding burden as 802.11ax.

Figure 22:
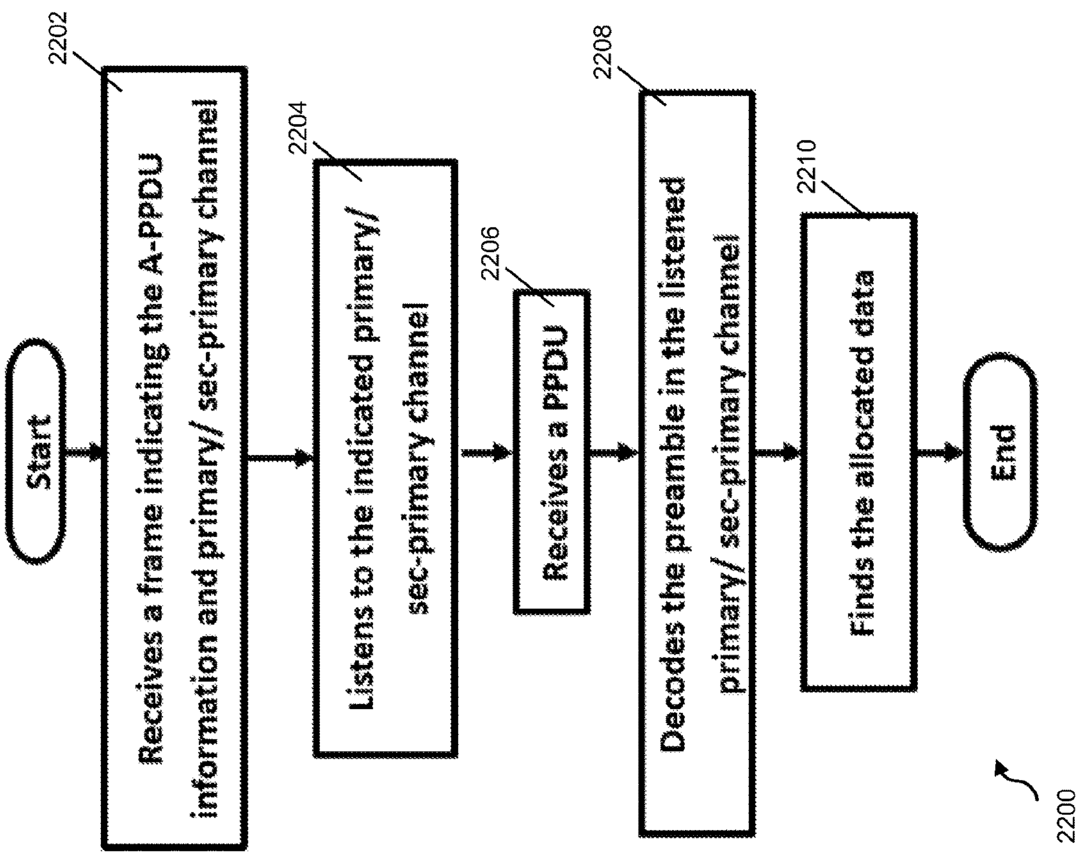
FIG. 22 depicts a flow chart illustrating a process for receiving an A-PPDU by a non-AP STA according to another example of the first embodiment of the present disclosure.

FIG. 22 depicts a flow chart 2200 illustrating a process for receiving an A-PPDU by a non-AP STA according to another example of the first embodiment of the present disclosure. In step 2202, a step of receiving a frame indicating the A-PPDU information and primary/sec-primary channel is carried out. In step 2204, a step of listening to the indicated primary/sec-primary channel is carried out. In step 2206, a step of receiving a PPDU is carried out. In step 2208, a step of decoding the preamble in the listened primary/sec-primary channel is carried out. In step 2210, a step of finding the allocated data is carried out.

In the following paragraphs, a second embodiment of the present disclosure which relates to DL A-PPDU transmission using dynamic A-PPDU is explained, where the A-PPDU pattern may be dynamic. In this embodiment, parameters of PPDU for example the bandwidth/overlapping subchannels (adhering to A-PPDU BW rules) and combination of amendments contained in an A-PPDU can be dynamic within a TXOP/duration. A presence of an A-PPDU in the TXOP/duration may be indicated by the AP, for example, using Beacon/Probe frame or a MU-RTS trigger frame. Similar to the first embodiment, the AP decides whether to transmit a secondary PPDU of an A-PPDU to a non-AP STA based on its operating bandwidth, capabilities and/or its feedback; and a non-AP STA determines and decides whether to listen to any secondary channel (other than the primary channel) based on its operating bandwidth and capabilities.

In this embodiment, non-AP STAs listen to and decode the primary channel and all possible lowest 40 MHz of the secondary PPDU in an A-PPDU in parallel or simultaneously. In one option (Option 1), there is no signaling for A-PPDU indication contained in preamble of an A-PPDU. Upon receipt of a PPDU from the AP, non-AP STAs will determine if a received PPDU is an A-PPDU through (i) determining whether a valid secondary PPDU signal is detected and/or (ii) the decoding result of RU allocation in PPDU(s), without the signaling for A-PPDU indication in the A-PPDU preamble.

Where a receiver non-AP STA is to determine if a received PPDU is an A-PPDU through determining whether a valid secondary PPDU signal is detected, the receiver non-AP STA of a group of non-AP STAs needs to decode until HE-SIG-A/U-SIG field to check PHY Version ID, bandwidth and BSS color. The receiver non-AP STA stops decoding on the primary PPDU once a valid secondary PPDU signal that is out of the primary PPDU's bandwidth is detected. If more than one valid secondary PPDU is detected, the receiver non-AP STA keeps decoding on the PPDU in higher frequency. Under this option, the AP shall not transmit data in a primary PPDU of an A-PPDU to those STAs who listen to the primary channel and other subchannel(s) simultaneously.

On the other hand, where a receiver non-AP STA is to determine if a received PPDU is an A-PPDU based on the decoding result of RU allocation in PPDU(s). The receiver non-AP STA needs to decode until the RU allocation field in HE-SIG-B/EHT-SIG field. The receiver non-AP STA stops decoding once find the allocated RU. In this case, the AP may send data in a primary PPDU of an A-PPDU to those non-AP STAs who listen to primary and sec-primary subchannel simultaneously.

The effect of this option to determine if a received PPDU is an A-PPDU without the signaling for A-PPDU indication is that at least a number of BW/40 of decoders are needed, where BW is the operating bandwidth of the receiver non-AP STA.

Alternatively, in another option (Option 2), there is signaling (e.g. in L-SIG field) for A-PPDU indication contained in preamble of an A-PPDU. Upon receipt of a PPDU from the AP, non-AP STAs will determine if a received PPDU is an A-PPDU using a $4^{th}$ bit (B4) of L-SIG field of the primary PPDU and the secondary PPDU.

Figure 23:
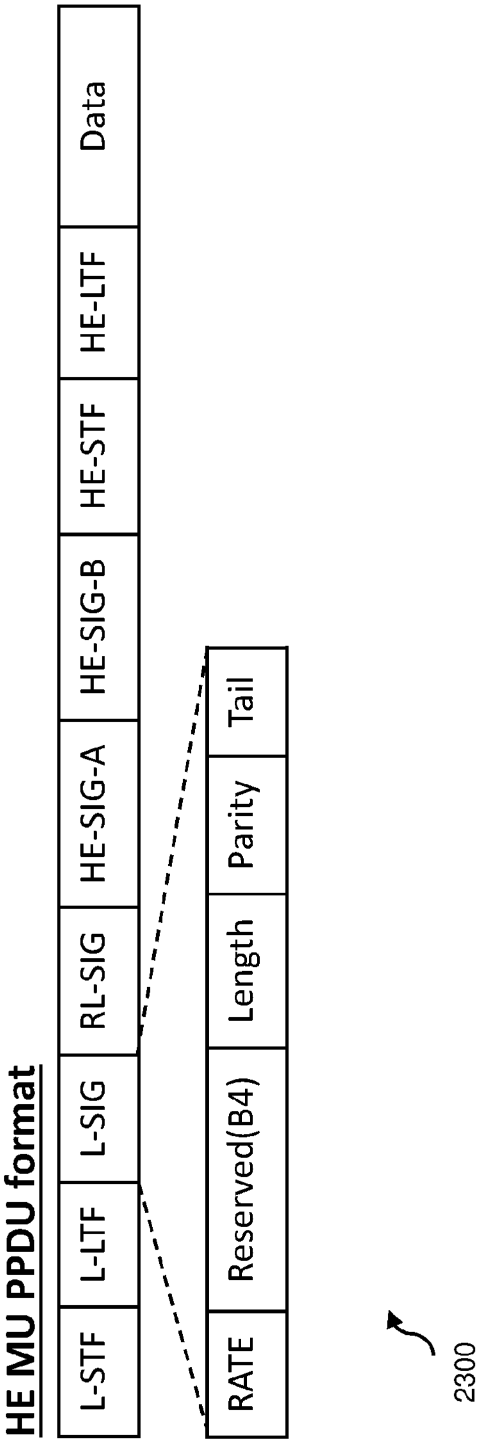
FIG. 23 depicts an example format of an HE MU PPDU.

FIG. 23 depicts an example format of an HE MU PPDU 2300. The HE MU PPDU 2300 comprises a L-STF (short training field), a L-LTF, a L-SIG field, a RL-SIG field, a HE-SIG A field, a HE-SIG B field, a HE-STF field, a HE-LTF field and a data field. The L-STF, L-LTF, L-SIG field and RL-SIG field may be grouped together and referred to as L-part. The L-SIG field comprises a RATE field, a reserved field, a Length field and a Parity field and a Tail field. The B4 in L-SIG field is reserved, and it shall be set to 0 on transmit and ignored on receipt. If B4 in L-SIG field of the primary PPDU is set as 1, A-PPDU transmission and the presence of a secondary PPDU is indicated. If B4 in L-SIG of a subchannel is set as 0, the lowest frequency of the secondary PPDU is indicated. As such, the receiver non-AP STAs will know the possible position of secondary PPDU when read the indication in L-SIG field of different subchannels, so it can stop decoding on other 40 MHz subchannels. The receiver non-AP STA continues to decode the primary channel till the BSS color of the possible secondary PPDU is verified. Under this option, the AP shall not transmit data in a primary PPDU of an A-PPDU to those STAs who listen to primary and sec-primary subchannel simultaneously.

Figure 24:
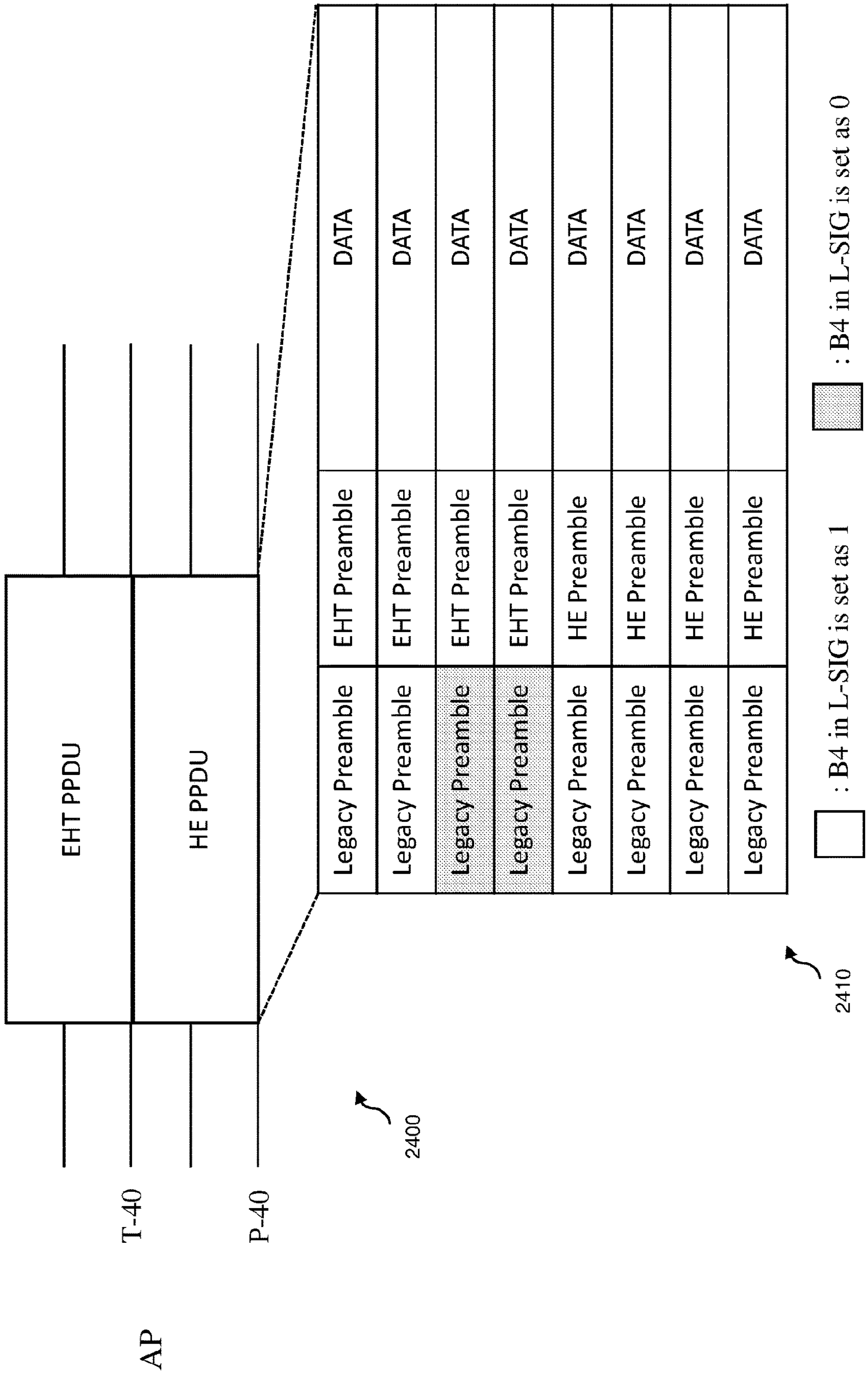
FIG. 24 depicts PPDUs of an A-PPDU and their preambles according to the second embodiment of the present disclosure.

FIG. 24 depicts PPDUs of an A-PPDU 2400 and their preambles according to the second embodiment of the present disclosure. In this example, there are four 40 MHz channels each can be subdivided into 2 and form a total of eight 20 MHz subchannels. An 80 MHz EHT PPDU is transmitted in the third 40 MHz channel (T40) while a 40 MHz HE PPDU is transmitted in the primary 40 MHz channel (P40). A table 2410 depicts a breakdown of the preambles and data fields of the PPDU transmitted in respective 20 MHz subchannels. The HE PPDU (primary PPDU) transmitted in the P40 comprises a legacy preamble followed by HE preamble and data field in each 20 MHz subchannel. The B4 bit in L-SIG field of the legacy preamble of the primary PPDU is set to 1 to indicate a presence of a secondary PPDU. The EHT PPDU (secondary PPDU) transmitted in the T40 comprises a legacy preamble followed by EHT preamble and data field in each 20 MHz subchannel. The B4 bit in L-SIG field of the legacy preamble of the secondary PPDU transmitted in the T40 is set to 0 to indicate the lowest frequency of the secondary PPDU. As such, the receiver non-AP STAs determine it is an A-PPDU and a secondary PPDU is transmitted from T40 and above.

Figure 25B:
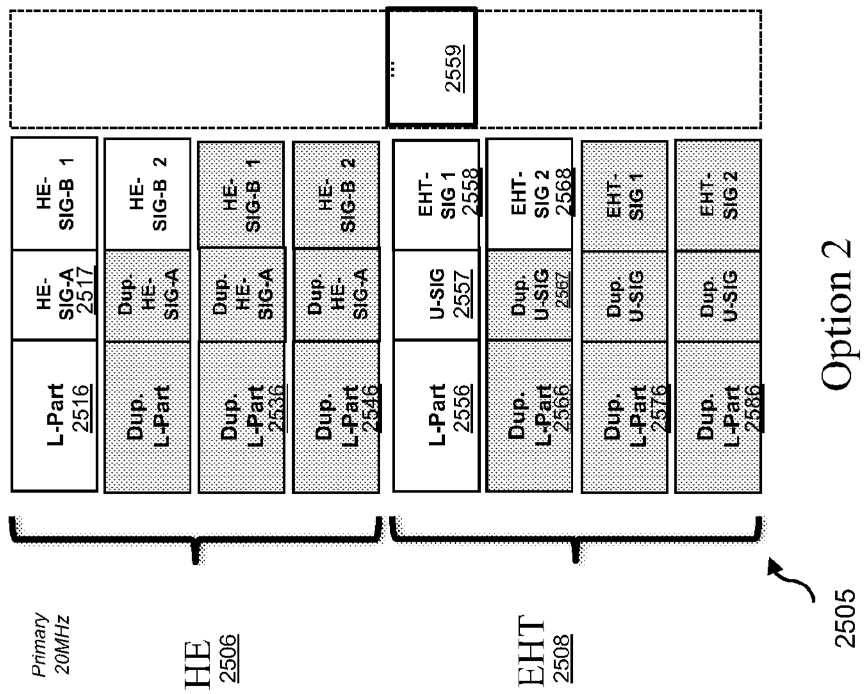
FIG. 25B depicts an A-PPDU transmitted to a non-AP STA according to another example of the second embodiment of the present disclosure.
Figure 25A:
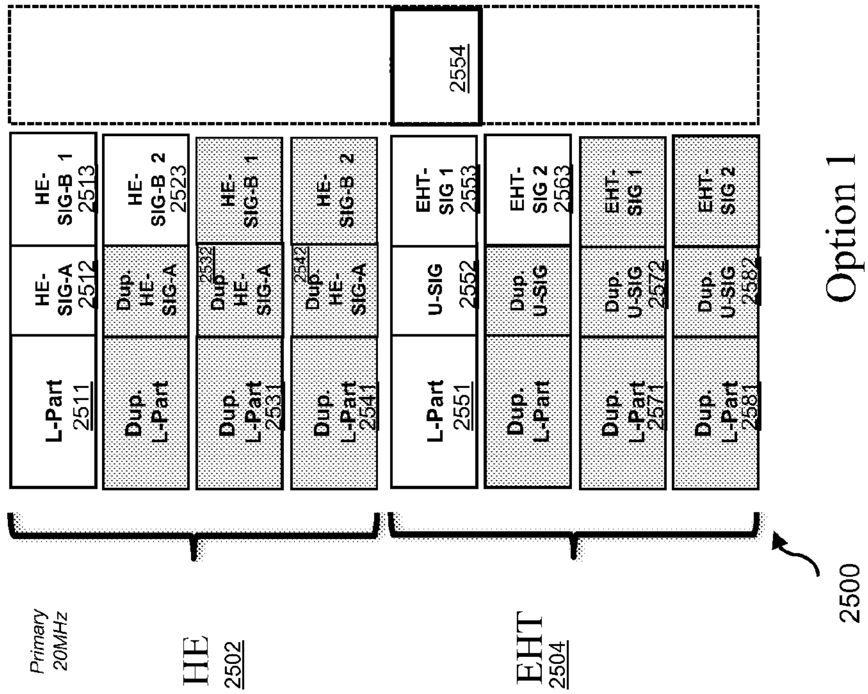
FIG. 25A depicts an A-PPDU transmitted to a non-AP STA according to an example of the second embodiment of the present disclosure.

FIG. 25A depicts an A-PPDU 2500 transmitted to a non-AP STA according to an example of the second embodiment of the present disclosure. The A-PPDU comprises an HE PPDU 2502 transmitted in the P40 and S40 and an EHT PPDU 2504 transmitted in the T40 and F40. In this example, under the second embodiment Option 1 where the non-AP STA determine if the PPDU is an A-PPDU without a signaling for A-PPDU indication contained in preamble of the A-PPDU, the non-AP STA listens to and decodes the P40 and all possible lowest 40 MHz of the secondary PPDU (in this case, S40, T40. F40) simultaneously. In particular, the non-AP STA may decode from L-parts until HE-SIG-B/EHT SIG fields at all subchannels of HE PPDU 2502 and EHT PPDU 2504 in parallel, and in this case, it detects a RU allocated to it in the T40. the non-AP STA then stops decoding the preamble once it finds its allocated RU. After decoding the A-PPDU preamble, the non-AP STA then finds its allocated data in the data field 2554 in the T40. In this example, the minimum required portion for decoding the A-PPDU 2500 in this example includes the L-Part 2511, HE-SIG-A field 2512, HE-SIG-B field 1 2513 and HE-SIG-B 2 2523 of the HE PPDU 2502 in the P40; duplicated L-Parts 2531, 2541 duplicated H-SIG-A fields 2532, 2542 of the HE PPDU 2502 in the S40; the L-Part 2551; U-SIG field 2552, EHT-SIG field 1 2553, EHT-SIG field 2 2563 and Data field 2554 of the EHT PPDU 2504 in the T40; and the duplicated L-Parts 2571, 2581 and duplicated H-SIG-A fields 2572, 2582 of the EHT PPDU 2504 in the F40.

FIG. 25B depicts an A-PPDU 2505 transmitted to a non-AP STA according to another example of the second embodiment of the present disclosure. The A-PPDU comprises an HE PPDU 2506 transmitted in the P40 and S40 and an EHT PPDU 2508 transmitted in the T40 and F40. In this example, under the second embodiment Option 2 where the non-AP STA determines if the PPDU is an A-PPDU with a signaling for A-PPDU indication contained in preamble of the A-PPDU, the non-AP STA listens to and decodes the P40 and all possible lowest 40 MHz of the secondary PPDU (in this case, S40, T40 and F40) simultaneously. In particular, the non-AP STA may decode L-Part 2516 and HE-SIG-A field 2517 of the P40. The receiver non-AP STA may detect that B4 in L-SIG field of the L-Part 2516 is set to 1 indicating a presence of a secondary PPDU. The receiver non-AP STA may then check L-SIG fields of L-Parts in S40. T40 and F40 to determine a position of the secondary PPDU. The non-AP STA may detect B4 in L-SIG field of the L-part 2556 in the T40 is set to 0 indicating the lowest frequency and the position of the secondary PPDU, continue to decode the secondary PPDU and find its allocated data in the data field 2559 in T40. In this example, the minimum required portion for decoding the A-PPDU 1605 in this example includes the L-Part 2516, HE-SIG-A field 2517, HE-SIG-B field 1 2518 and HE-SIG-B 2 2528 of the HE PPDU 2506 in the P40; a portion of the L-Parts 2536, 2546 of the HE PPDU 2506 in the S40; the L-Part 2556, U-SIG field 2557, EHT-SIG field 1 2558, EHT-SIG field 2 2568 and Data field 2559 of the EHT PPDU 2504 in the T40; and a portion of the L-Parts 2576, 2586 of the EHT PPDU 2506 in the F40.

In the following paragraphs, a third embodiment of the present disclosure which relates to DL A-PPDU transmission using half-dynamic A-PPDU is explained, where some parameters of PPDU (e.g., bandwidth/overlapping subchannel) in an A-PPDU can be dynamic, but still adhering to A-PPDU BW rules.

In this embodiment, some restrictions on A-PPDU shall be applied and broadcasted before DL A-PPDU transmission to reduce the number of parallel decoding subchannels and thus reduce the number of decoders. Examples of restrictions include a minimal distance on frequency between different PPDUs and a maximal number of PPDUs contains in an A-PPDU.

The AP may use a Beacon/Probe Response frame or a MU-RTS trigger frame to indicate the A-PPDU information and restrictions. Similar to the first and second embodiments, the AP decides whether to transmit a secondary PPDU of an A-PPDU to a non-AP STA based on its operating bandwidth, capabilities and/or its feedback; and a non-AP STA determines and decides whether to listen to any secondary channel (other than the primary channel) based on its operating bandwidth and capabilities.

Figure 26:
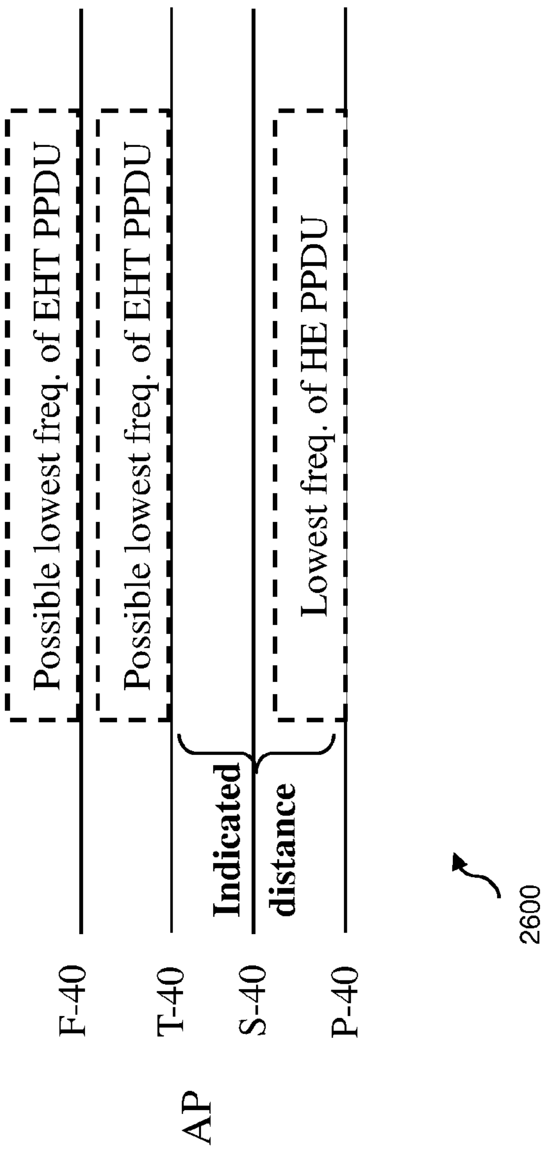
FIG. 26 depicts a flow diagram illustrating an example channel allocation of PPDUs of different amendments according to the third embodiment of the present disclosure.

FIG. 26 depicts a flow diagram 2600 illustrating an example channel allocation of PPDUs of different amendments according to the third embodiment of the present disclosure. In this example, a minimum distance of 80 MHz between different PPDUs may be indicated, and, if an HE PPDU of an A-PPDU is transmitted in the primary 40 MHz channel (P40), the possible lowest frequency of EHT PPDU in the A-PPDU should be at the third or fourth 40 MHz channel (T40 or F40).

In this embodiment, non-AP STAs listen to and decode the primary channel and all other lowest 40 MHz (decided based on indicated parameters) of the secondary PPDU in an A-PPDU in parallel or simultaneously. In one option (Option 1), there is no signaling for A-PPDU indication contained in preamble of an A-PPDU. It is noted that a non-AP STA needs to decide at most 40 MHz preamble to obtain all information required for decoding data. Upon receipt of a PPDU from the AP, non-AP STAs will determine if a received PPDU is an A-PPDU through (i) determining whether a valid secondary PPDU signal is detected and/or (ii) the decoding result of RU allocation in PPDU(s), without the signaling for A-PPDU indication in the A-PPDU preamble.

Where a receiver non-AP STA is to determine if a received PPDU is an A-PPDU through determining whether a valid secondary PPDU signal is detected, the receiver non-AP STA of a group of non-AP STAs needs to decode until HE-SIG-A/U-SIG field to check PHY Version ID, bandwidth and BSS color. The receiver non-AP STA stops decoding on the primary PPDU once a valid secondary PPDU signal that is out of the primary PPDU's bandwidth is detected. If more than one valid secondary PPDU is detected, the receiver non-AP STA keeps decoding on the PPDU in higher frequency. Under this option, the AP shall not transmit data in a primary PPDU of an A-PPDU to those STAs who listen to the primary channel and other subchannel(s) simultaneously.

On the other hand, where a receiver non-AP STA is to determine if a received PPDU is an A-PPDU based on the decoding result of RU allocation in PPDU(s). The receiver non-AP STA needs to decode until the RU allocation field in HE-SIG-B/EHT-SIG field. The receiver non-AP STA stops decoding once find the allocated RU. In this case, the AP may send data in a primary PPDU of an A-PPDU to those non-AP STAs who listen to primary and sec-primary subchannel simultaneously.

Figure 27:
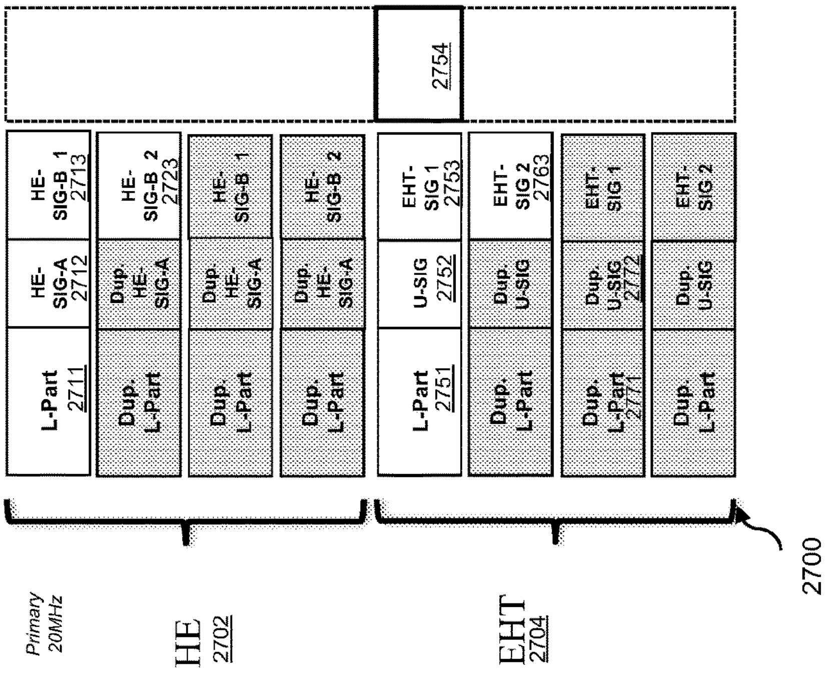
FIG. 27 depicts an A-PPDU transmitted to a non-AP STA according to an example of the third embodiment of the present disclosure.

FIG. 27 depicts an A-PPDU 2700 transmitted to a non-AP STA according to an example of the third embodiment of the present disclosure. The A-PPDU comprises an HE PPDU 2702 transmitted in the P40 and S40 and an EHT PPDU 2704 transmitted in the T40 and F40. In this example, under the third embodiment Option 1 where the non-AP STA determines if the PPDU is an A-PPDU without a signaling for A-PPDU indication contained in preamble of the A-PPDU, the non-AP STA listens to and decodes the P40 and all other lowest 40 MHz of the secondary PPDU (in this case, T40 and F40) simultaneously. In particular, the non-AP STA may decode from L-parts until HE-SIG-B/EHT SIG fields of HE PPDU 2702 and EHT PPDU 2704 in parallel, and in this case, it detects a RU allocated to it in the T40. the non-AP STA then stops decoding the preamble once it finds its allocated RU. After decoding the A-PPDU preamble, the non-AP STA then finds its allocated data in the data field 2754 in the T40. In this example, assuming duplicated fields at higher frequency segment may not be decoded after decoding the corresponding fields at the lower frequency segment, the minimum required portion for decoding the A-PPDU 2700 in this example includes the L-Part 2711, HE-SIG-A field 2712, HE-SIG-B field 1 2713 and HE-SIG-B 2 2723 of the HE PPDU 2702 in the P40; the L-Part 2751; U-SIG field 2752, EHT-SIG field 1 2753, EHT-SIG field 2 2763 and Data field 2754 of the EHT PPDU 2704 in the T40; and the duplicated L-Part 2771 and duplicated H-SIG-A fields 2772 of the EHT PPDU 2704 in the F40.

Alternatively, in another option (Option 2), there is signaling (e.g. in L-SIG field) for A-PPDU indication contained in preamble of an A-PPDU. Upon receipt of a PPDU from the AP, non-AP STAs will determine if a received PPDU is an A-PPDU using a $4^{th}$ bit (B4) of L-SIG field of the primary PPDU and the secondary PPDU.

Similar to the second embodiment, the B4 in L-SIG field can be used a signaling A-PPDU indication contained in preamble of an A-PPDU. The B4 in L-SIG field is reserved, and it shall be set to 0 on transmit and ignored on receipt. If B4 in L-SIG field of the primary PPDU is set as 1, A-PPDU transmission and the presence of a secondary PPDU is indicated. If B4 in L-SIG of a subchannel is set as 0, the lowest frequency of the secondary PPDU is indicated. As such, the receiver non-AP STAs will know the possible position of secondary PPDU when read the indication in L-SIG field of different subchannels, so it can stop decoding on other 40 MHz subchannels. The receiver non-AP STA continues to decode the primary channel till the BSS color of the possible secondary PPDU is verified. Under this option, the AP shall not transmit data in a primary PPDU of an A-PPDU to those STAs who listen to primary and sec-primary subchannel simultaneously.

Figure 28:
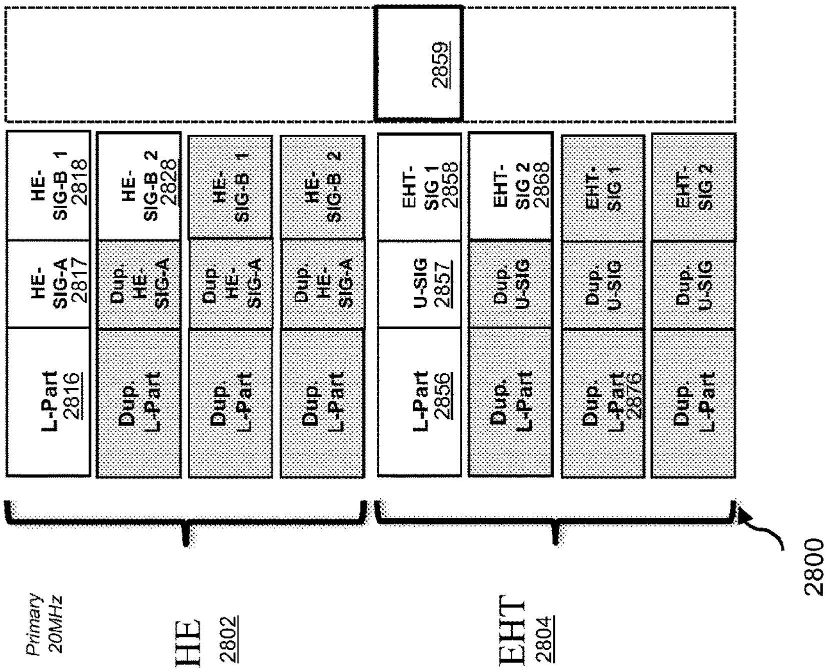
FIG. 28 depicts an A-PPDU transmitted to a non-AP STA according to another example of the third embodiment of the present disclosure.

FIG. 28 depicts an A-PPDU 2800 transmitted to a non-AP STA according to another example of the third embodiment of the present disclosure. The A-PPDU comprises an HE PPDU 2802 transmitted in the P40 and S40 and an EHT PPDU 2804 transmitted in the T40 and F40. In this example, under the third embodiment Option 2 where the non-AP STA determines if the PPDU is an A-PPDU with a signaling for A-PPDU indication contained in preamble of the A-PPDU, the non-AP STA listens to and decodes the primary 40 MHz channel (P40) and all other lowest 40 MHz of the secondary PPDU (in this case, T40 and F40) simultaneously. In particular, the non-AP STA may decode L-Part 2816 and HE-SIG-A field 2817 of the P40. The receiver non-AP STA may detect that B4 in L-SIG field of the L-Part 2816 is set to 1 indicating a presence of a secondary PPDU. The receiver non-AP STA may then check L-SIG fields of L-Parts 2856, 2876 of other 40 MHz channels to determine a position of the secondary PPDU. The receiver non-AP STA may detect B4 in L-SIG field of the L-part 2856 in the T40 is set to 0 indicating the lowest frequency and the position of the secondary PPDU. The non-AP STA may continue to decode until HE-SIG-B/EHT SIG fields of HE PPDU 2702 and EHT PPDU 2704 in parallel, and in this case, it detects a RU allocated to it in the T40. The non-AP STA then stops decoding the preamble once it finds its allocated RU. After decoding the A-PPDU preamble, the non-AP STA then finds its allocated data in the data field 2859 in the T40. In this example, assuming duplicated fields at higher frequency segment may not be decoded after decoding the corresponding fields at the lower frequency segment, the minimum required portion for decoding the A-PPDU 2800 in this example includes the L-Part 2816, HE-SIG-A field 2817, HE-SIG-B field 1 2818 and HE-SIG-B field 2 2828 of the HE PPDU 2802 in the P40; the L-Part 2856; U-SIG field 2857, EHT-SIG field 1 2858, EHT-SIG field 2 2868 and Data field 2859 of the EHT PPDU 2704 in the T40; and a portion of the duplicated L-Part 2876 of the EHT PPDU 2704 in the F40.

The effect of this option of half dynamic A-PPDU is that there is flexibility in A-PPDU pattern, lower decoding burden than full dynamic A-PPDU but more decoders are needed as compared to static A-PPDU.

Figure 29:
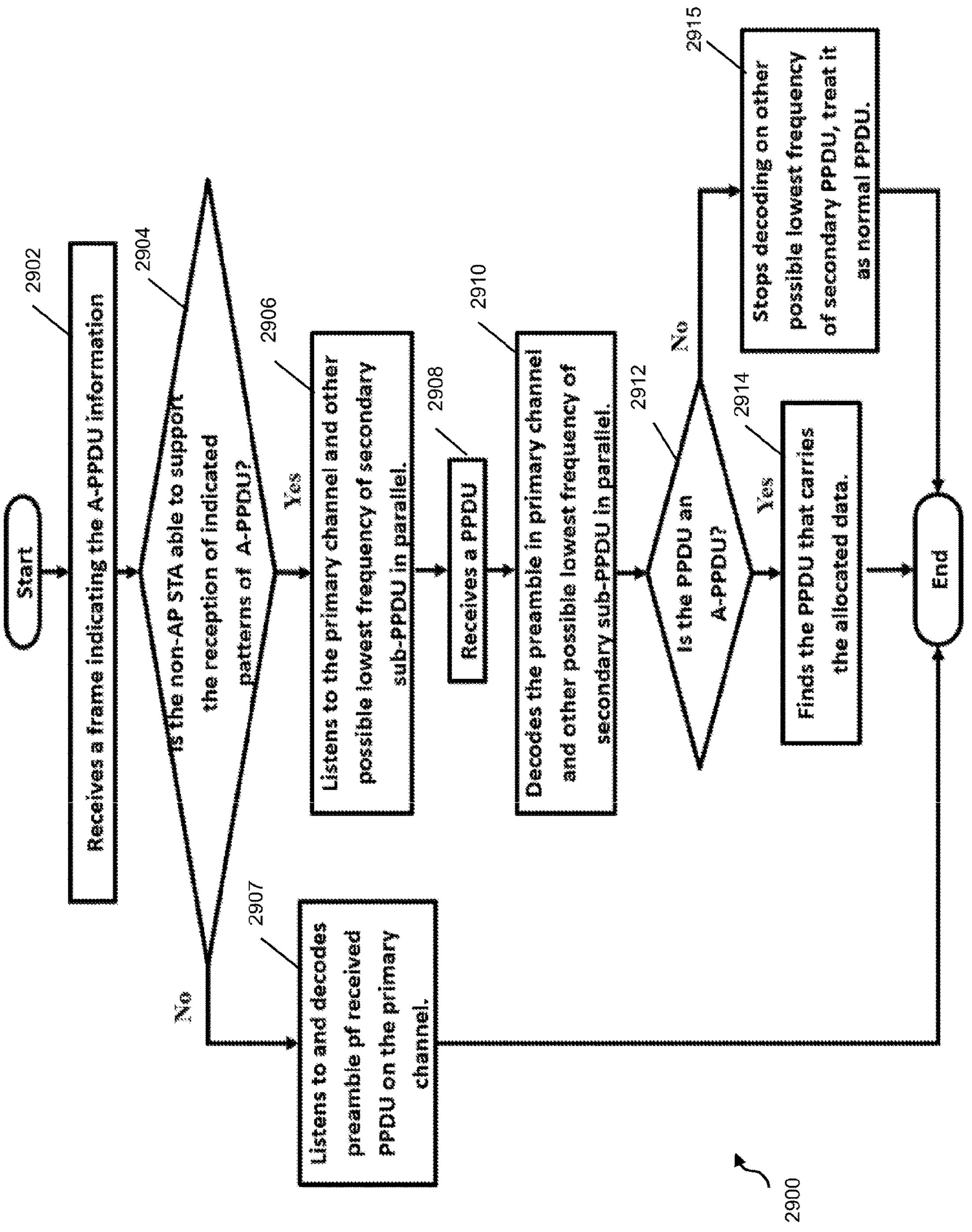
FIG. 29 depicts a flow chart illustrating a process for receiving an A-PPDU by a non-AP STA according to another example of the third embodiment of the present disclosure.

FIG. 29 depicts a flow chart 2900 illustrating a process for receiving an A-PPDU by a non-AP STA according to another example of the third embodiment of the present disclosure. In step 2902, a step of receiving a frame indicating A-PPDU information is carried out. In step 2904, a step of determining if the non-AP STA is able to support the reception of indicated patterns of A-PPDU is carried out. If it is determined that the non-AP STA is able to support, step 2906 is carried out; otherwise step 2907 is carried out. In step 2906, a step of listening to the primary channel and other possible lowest frequency of secondary PPDU in parallel is carried out. In step 2908, a step of receiving a PPDU is carried out. In step 2910, a step of decoding the preamble in primary channel and other possible lowest frequency of secondary sub-PPDU in parallel is carried out. In step 2912, a step of determining if the PPDU is an A-PPDU is carried out. If an A-PPDU is determined, step 2914 is carried out; otherwise step 2915 is carried out. In step 2914, a step of finding the PPDU that carried the allocated data is carried out and the process may end.

In step 2907, after it is determined that the non-AP STA is not able to support the reception of indicated patterns of A-PPDU, a step of listening to and decoding preamble of received PPDU on the primary channel is carried out, and the process may end. In step 2915, after it is determined that the PPDU is not an A-PPDU, a step of treating the PPDU as a normal PPDU and stop decoding on other possible lowest frequency of secondary PPDU is carried out and the process may end.

In the following paragraphs, a fourth embodiment of the present disclosure which relates to DL A-PPDU transmission with a preceding indication using a previously transmitted signal (e.g. MAC frame, a frame carrying A-control field) to indicate A-PPDU information for subsequent PPDU transmission.

Figure 30:
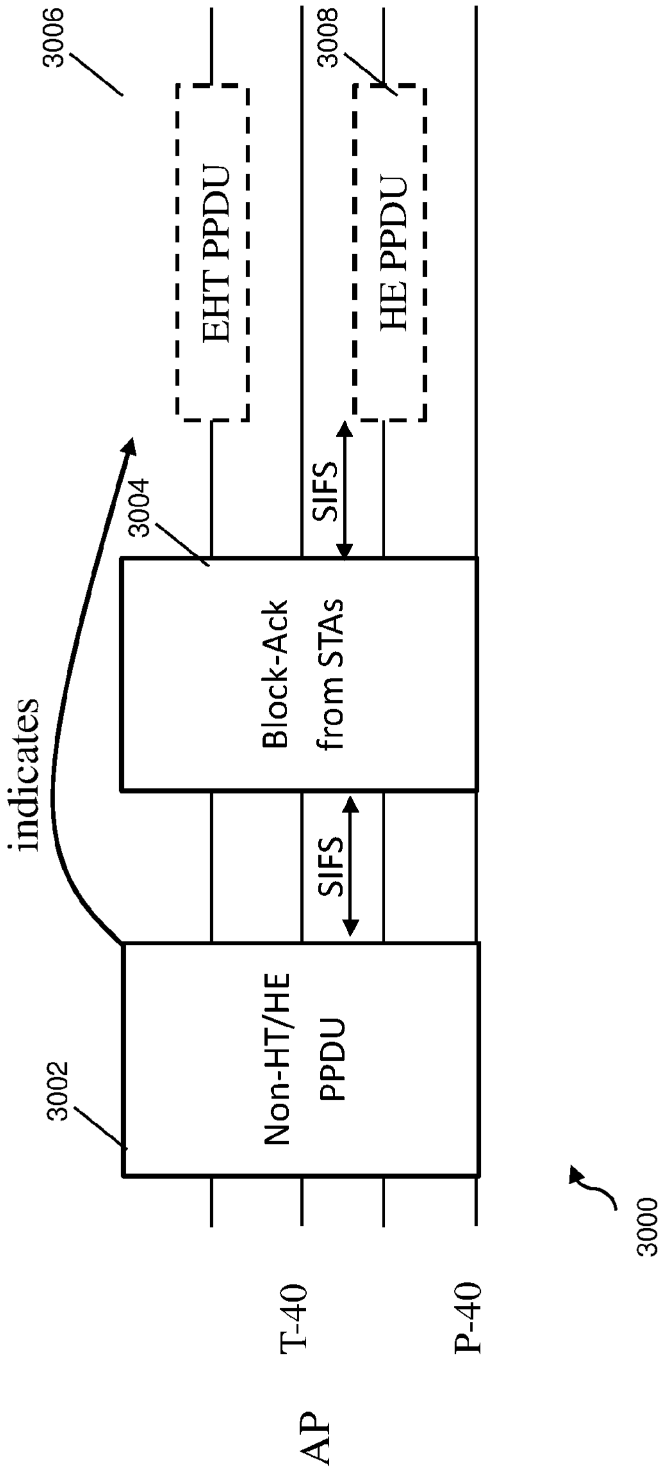
FIG. 30 depicts a flow diagram illustrating an A-PPDU transmission according to an example of a fourth embodiment of the present disclosure.

FIG. 30 depicts a flow diagram 3000 illustrating an A-PPDU transmission according to an example of the fourth embodiment of the present disclosure. An AP may transmit a non-HT/HE PPDU 3002 which contains A-PPDU information for a subsequent A-PPDU transmissions. The A-PPDU information may include AIDs of a group of non-AP STAs (e.g. intended receiver STAs) of the secondary PPDU and the lowest frequency of the secondary PPDU or the sec-primary channel number. For example, the AP may indicate to a non-AP STA to listen to and decode the preamble in the third 40 MHz channel (T40) only. After a SIFS, the AP may receive a BlockAck frame 3004 from the group of STAs acknowledging receipt of the PPDU 3002. Subsequently, after another SIFS, the AP may transmit an A-PPDU. In this example, the AP transmit the A-PPDU comprising an HE PPDU 3008 in the P40 and S40 and an EHT PPDU 3006 in the T40 and F40. The group of non-AP STAs will listen to and decode the EHT PPDU 3006 in the lowest frequency/or the sec-primary channel only, i.e. T40, as indicated in the preceding PPDU 3002. It is noted that the AP may add extra packet extension padding on the preceding PPDU 3002 to allow the intended non-AP STAs to switch channels.

Figure 31:
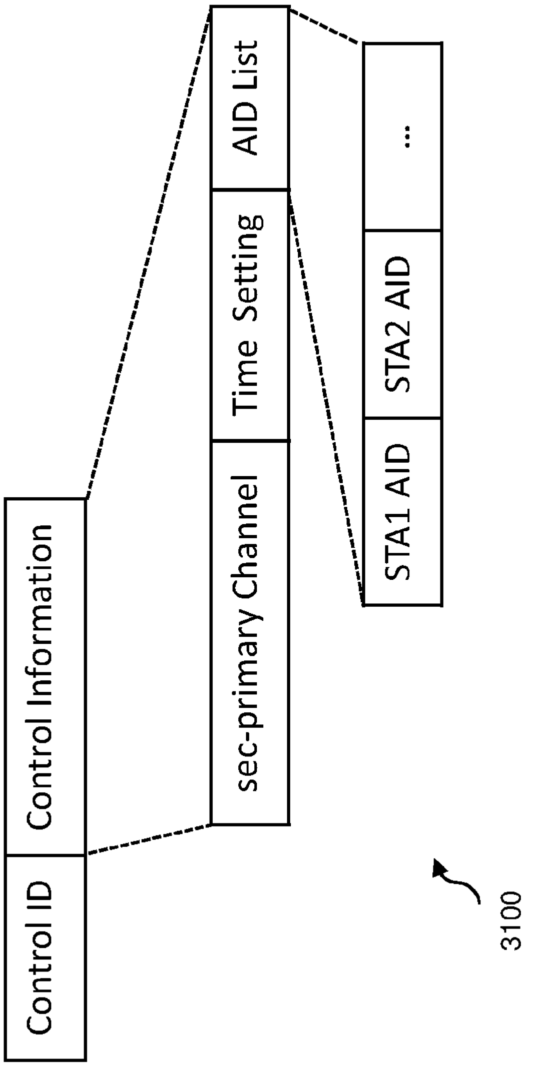
FIG. 31 depicts an example format of an A-PPDU Control subfield

FIG. 31 depicts an example format of an A-PPDU Control subfield 3100 of a frame carried by a PPDU. The A-PPDU Control subfield of the frame can be used to indicate a subsequent A-PPDU transmission and may comprise a Control ID field and a Control Information field, the Control Information field comprising a Sec-primary Channel field, a Time Setting field and an AID list. The Sec-primary Channel field indicates a channel number of the sec-primary channel which intended STAs shall listen to after reception of the PPDU carrying the frame. The Time Setting field may indicate the time of intended STAs need to listen to the sec-primary channel. The AID list comprises AIDs of intended STAs. In an alternative implementation, the target receiver of the frame carrying the A-PPDU Control subfield is the intended STA. In another alternative implementation, an intended amendment is indicated so that all STAs of the indicated amendment are intended STAs.

Figure 32:
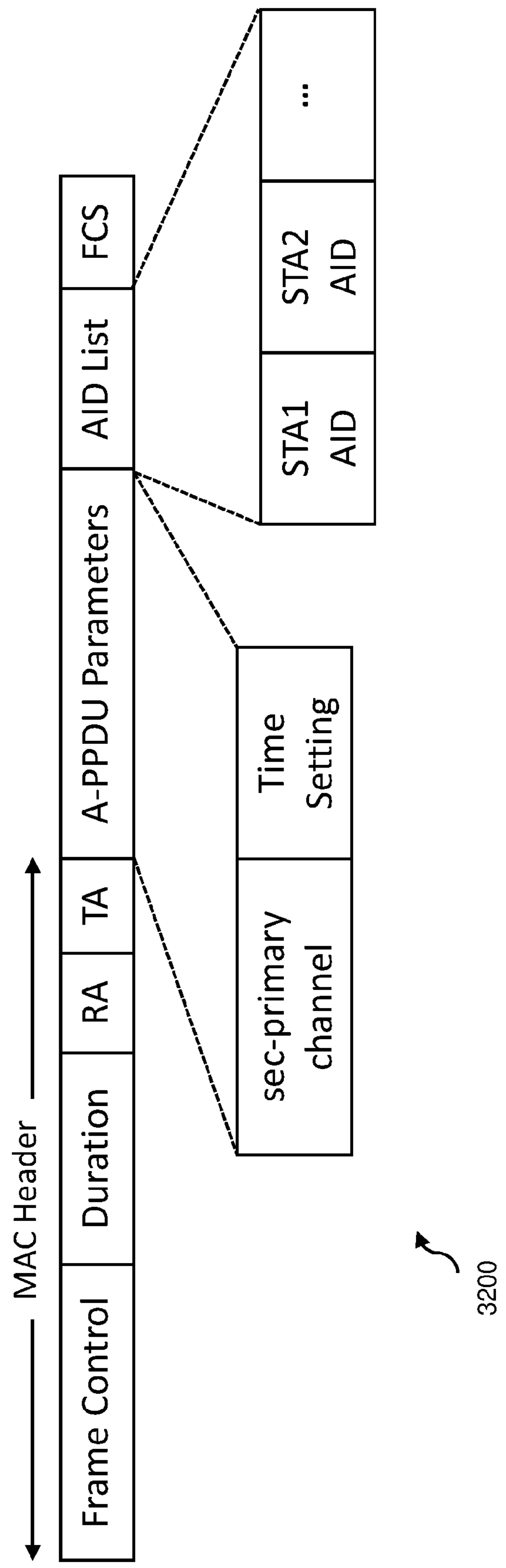
FIG. 32 depicts an example format of an A-PPDU Announcement frame

FIG. 32 depicts an example format of an A-PPDU Announcement frame 3200. The A-PPDU Announcement frame 3200 can be used to indicate a subsequent A-PPDU transmission and may comprise a Frame Control field, a Duration field, a RA field, a TA field, an A-PPDU Parameters field, an AID list field and a FCS field. The RA field is set as broadcast address. The A-PPDU Parameters field comprises a Sec-primary Channel field which indicates a channel number of the sec-primary channel which intended STAs shall listen to after reception of the PPDU carrying the frame and a Time Setting field which indicates the time of intended STAs need to listen to the sec-primary channel. The AID list field comprises AIDs of intended STAs.

Figure 33:
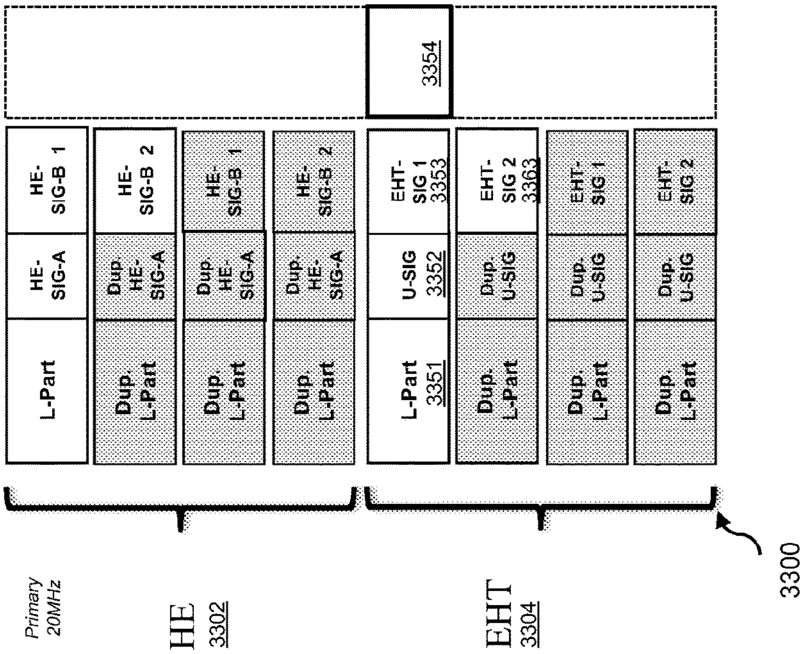
FIG. 33 depicts an A-PPDU transmitted to a non-AP STA according to an example of a fourth embodiment of the present disclosure.

FIG. 33 depicts an A-PPDU 3300 transmitted to a non-AP STA according to an example of the fourth embodiment of the present disclosure. In this example, the non-AP STA may have decoded a preceding PPDU indicating a sec-primary channel at the T40 and thus only listen to T40 in subsequent A-PPDU transmission. Upon receiving the A-PPDU 3300 comprising an HE PPDU 3302 in the P40 and S40 and a EHT PPDU 3304 in the T40 and the F40, the non-AP STA may only listen to the T40 and decode the EHT PPDU 3304 in the T40 and finds its allocated data in the data field 3354 in T40. In this example, assuming duplicated fields at higher frequency segment may not be decoded after decoding the corresponding fields at the lower frequency segment, the minimum required portion for decoding the A-PPDU 3300 in this example includes the L-Part 3351. U-SIG field 3352, EHT-SIG field 1 3353, EHT-SIG field 2 3363 and Data field 3354 of the EHT PPDU 3304 in the T40.

The effect of this embodiment to indicate A-PPDU using a preceding signal is that there is flexibility in A-PPDU pattern and it has the decoding burden and number of decoders same as 802.11ax.

Figure 34:
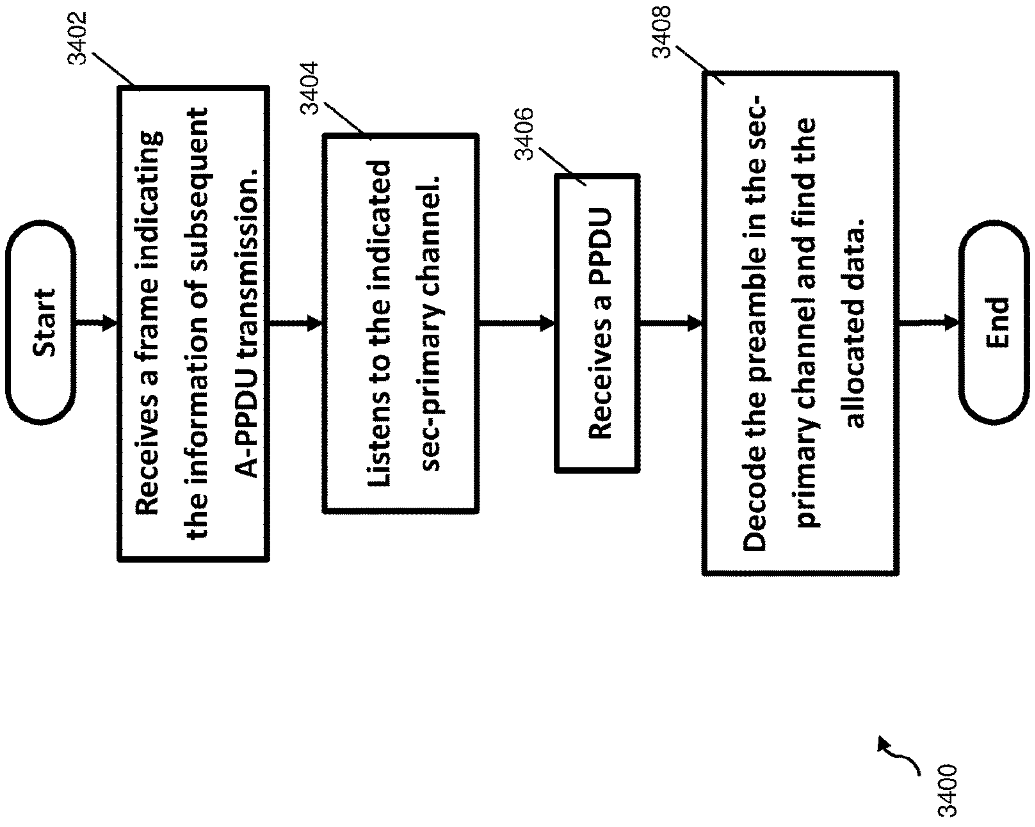
FIG. 34 depicts a flow chart illustrating process for receiving an A-PPDU by a non-AP STA according to the fourth embodiment of the present disclosure.

FIG. 34 depicts a flow chart 3400 illustrating process for receiving an A-PPDU by a non-AP STA according to the fourth embodiment of the present disclosure. In step 3402, a step of receiving a frame indicating information of subsequent A-PPDU transmission is carried out. In step 3404, a step of listening to the indicated sec-primary channel is carried out. In step 3406, a step of receiving a PPDU is carried out. In step 3408, a step of decoding the preamble in the sec-primary channel and find the allocated data in the sec-primary channel is carried out, and the process may end.

According to the present disclosure, when EHT+devices come to market, it is possible for EHT PPDU to be a primary PPDU in an A-PPDU. In this case, bits in Disregard subfield of U-SIG field of an EHT PPDU could be reused to indicate A-PPDU transmission and the presence of a secondary PPDU.

Figure 35:
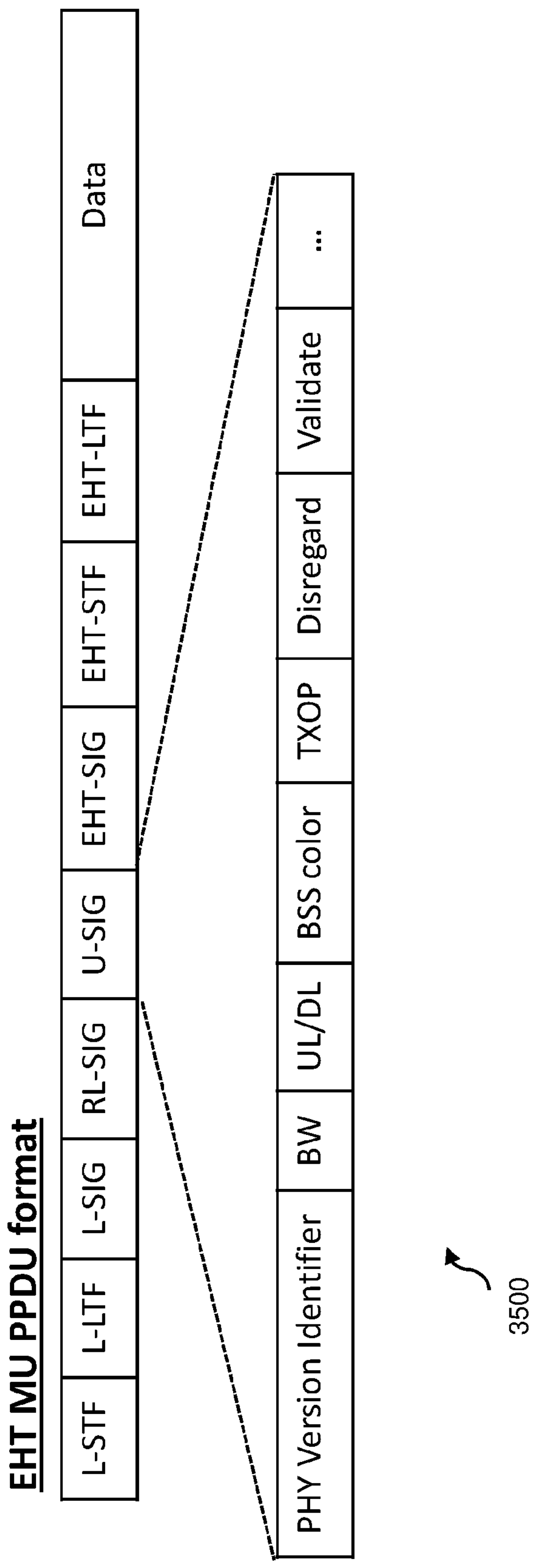
FIG. 35 depicts an example format of an EHT MU PPDU.

FIG. 35 depicts an example format of an EHT MU PPDU 3500. The EHT MU PPDU 3500 comprises a L-STF, a L-LTF, a L-SIG field, a RL-SIG field, a U-SIG field, an EHT-SIG field an EHT-STF field, an EHT-LTF field and a Data field. The U-SIG field further comprises a PHY Version ID field, a BW field, a UL/DL field, a BSS Color field, a TXOP field and a Disregard field and a Validate field. The disregard field of U-SIG field of the EHT MU PPDU 3500 can be reused to indicate A-PPDU transmission and the presence of a secondary PPDU (e.g. that allocated to EHT+ STAs) when EHT PPDU becomes a primary PPDU.

Figure 36:
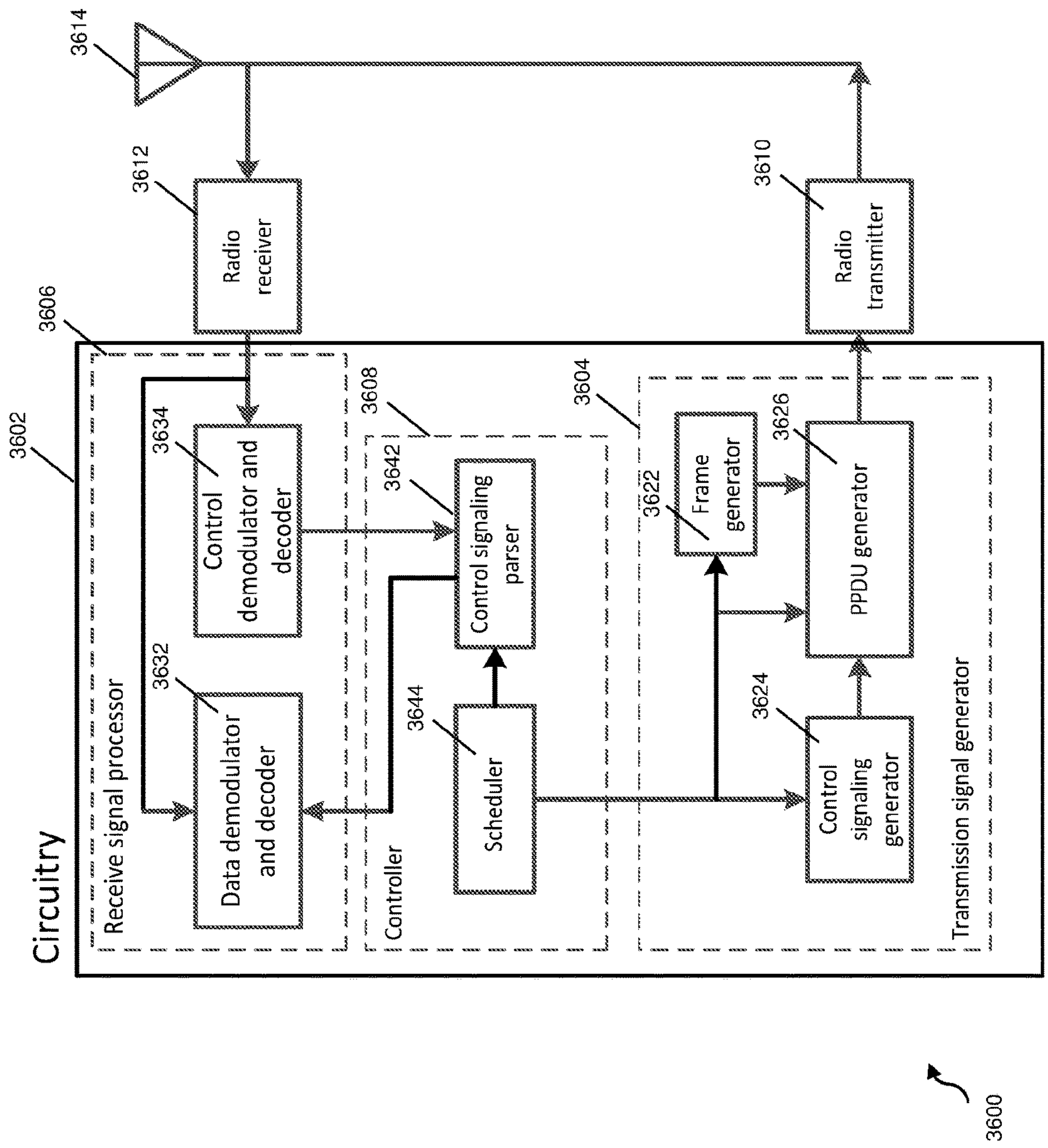
FIG. 36 shows a configuration of a communication apparatus, for example an AP, according to the present disclosure.

FIG. 36 shows a configuration of a communication apparatus, for example an AP, according to the present disclosure. Similar to the schematic example of the communication apparatus 800 shown in FIG. 8, the communication apparatus 3600 includes circuitry 3602, at least one radio transmitter 3610, at least one radio receiver 3612, at least one antenna 3614 (for the sake of simplicity, only one antenna is depicted in FIG. 36). The circuitry 3602 may include at least one controller 3608 for use in software and hardware aided execution of tasks that the controller 3608 is designed to perform communication for an aggregated signal. The circuitry 3602 may further include a transmission signal generator 3604 and a receive signal processor 3606. The at least one controller 3608 may control the transmission signal generator 3604 and the receive signal processor 3606. The transmission signal generator 3604 may include a frame generator 3622, a control signaling generator 3624, and a PPDU generator 3626. The frame generator 3622 may generate MAC frames (e.g. A-PPDU Announcement frames, Beacon frame, Probe Response frame, MU-RTS trigger frame, NFRP trigger frame). The control signaling generator 3624 may generate control signaling fields of PPDUs to be generated (e.g. HE-SIG-A fields and HE-SIG-B fields of HE PPDUs, U-SIG fields and EHT-SIG fields of EHT PPDUs). The PPDU generator 3626 may generate PPDUs (e.g. HE/EHT/EHT+PPDUs).

The receive signal processor 3606 may include a data demodulator and decoder 3634, which may demodulate and decode data portions of the received signals (e.g. data fields of HE/EHT/EHT+PPDUs). The receive signal processor 3606 may further include a control demodulator and decoder 3634, which may demodulate and decode control signaling portions of the received signals (e.g. HE-SIG-A, HE-SIG-B of HE PPDUs, U-SIG fields and EHT-SIG fields of EHT PPDUs). The at least one controller 3608 may include a control signal parser 3642 and a scheduler 3644. The scheduler 3644 may determine RU information and user-specific allocation information for allocations of downlink transmissions and triggering information for allocations of uplink transmissions. The control signal parser 3642 may analyze the control signaling portions of the received signals and the triggering information for allocations of uplink MU transmissions shared by the scheduler 3644 and assist the data demodulator and decoder 3632 in demodulating and decoding the data portions of the received signals.

Figure 37:
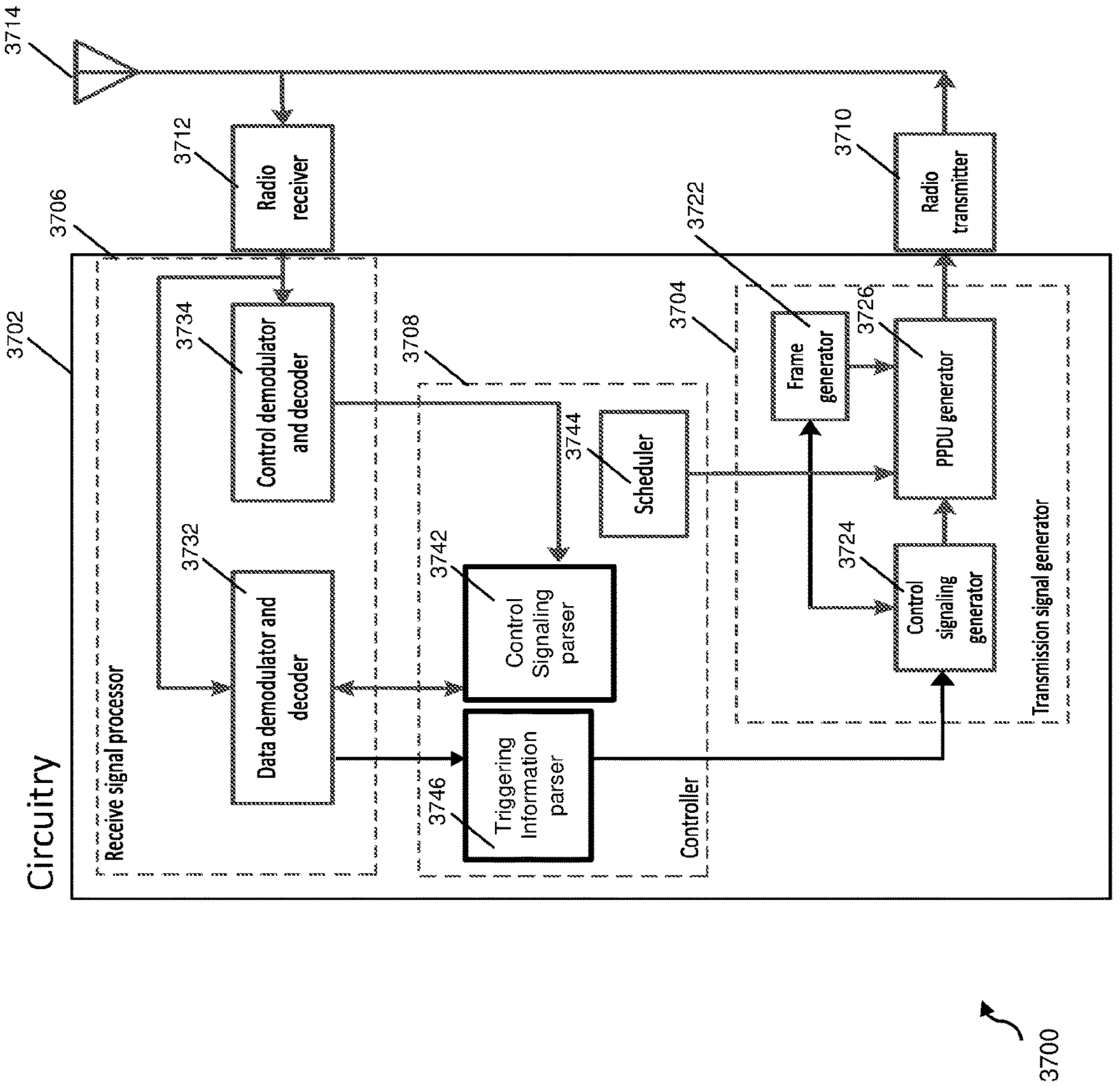
FIG. 37 shows a configuration of a communication apparatus, for example an STA, according to the present disclosure.

FIG. 37 shows a configuration of a communication apparatus, for example an STA, according to the present disclosure. Similar to the schematic example of communication apparatus 800 shown in FIG. 8, the communication apparatus 3700 includes circuitry 3702, at least one radio transmitter 3710, at least one radio receiver 3712, at least one antenna 3714 (for the sake of simplicity, only one antenna is depicted in FIG. 37). The circuitry 3702 may include at least one controller 3708 for use in software and hardware aided execution of tasks that the controller 3708 is designed to perform communication for an aggregated signal. The circuitry 3702 may further include a receive signal processor 3704 and a transmission signal generator 3706. The at least one controller 3708 may control the receive signal processor 3704 and the transmission signal generator 3706. The receive signal processor 3704 may include a data demodulator and decoder 3732 and a control demodulator and decoder 3734. The control demodulator and decoder 3734 may demodulate and decode control signaling portions of the received signals (e.g. U-SIG fields and EHT-SIG fields of EHT MU PPDUs). The data demodulator and decoder 3732 may demodulate and decode data portions of the received signals (e.g. data fields of EHT MU PPDUs) according to RU information and user-specific allocation information of its own allocations.

The at least one controller 3708 may include a control signal parser 3742, and a scheduler 3744 and a trigger information parser 3746. The control signal parser 3742 may analyze the control signaling portions of the received signals (e.g. U-SIG field and EHT-SIG fields of EHT MU PPDUs) and assist the data demodulator and decoder 3732 in demodulating and decoding the data portions of the received signals (e.g. data fields of EHT MU PPDUs). The triggering information parser 3748 may analyze the triggering information for its own uplink allocations from the received triggering frames contained in the data portions of the received signals. The transmission signal generator 3704 may include a control signalling generator 3724, which may generate control signalling fields of PPDUs to be generated (e.g. HE-SIG-A fields and HE-SIG-B fields of HE PPDUs, U-SIG fields and EHT-SIG fields of EHT PPDUs). The transmission signal generator 3704 may further include a PPDU generator 3726, which generate PPDUs (e.g. HE/EHT/EHT+PPDUs). The transmission signal generator 3704 may further include a frame generator 3722 may generate MAC frames (e.g. A-PPDU Announcement frames, Beacon frame, Probe Response frame, MU-RTS trigger frame, NFRP trigger frame).

As described above, the embodiments of the present disclosure provide communication methods and communication apparatuses for transmitting/receiving an A-PPDU without SST support.

The present disclosure can be realized by software, hardware, or software in cooperation with hardware. Each functional block used in the description of each embodiment described above can be partly or entirely realized by an LSI (large-scale integration) such as an integrated circuit, and each process described in each embodiment may be controlled partly or entirely by the same LSI or a combination of LSIs. The LSI may be individually formed as chips, or one chip may be formed so as to include a part or all of the functional blocks. The LSI may include a data input and output coupled thereto. The LSI here may be referred to as an IC, a system LSI, a super LSI, or an ultra LSI depending on a difference in the degree of integration. However, the technique of implementing an integrated circuit is not limited to the LSI and may be realized by using a dedicated circuit, a general-purpose processor, or a special-purpose processor. In addition, a FPGA (Field Programmable Gate Array) that can be programmed after the manufacture of the LSI or a reconfigurable processor in which the connections and the settings of circuit cells disposed inside the LSI can be reconfigured may be used. The present disclosure can be realized as digital processing or analogue processing. If future integrated circuit technology replaces LSIs as a result of the advancement of semiconductor technology or other derivative technology, the functional blocks could be integrated using the future integrated circuit technology. Biotechnology can also be applied.

The present disclosure can be realized by any kind of apparatus, device or system having a function of communication, which is referred as a communication device.

Some non-limiting examples of such communication device include a phone (e.g., cellular (cell) phone, smart phone), a tablet, a personal computer (PC) (e.g., laptop, desktop, netbook), a camera (e.g., digital still/video camera), a digital player (digital audio/video player), a wearable device (e.g., wearable camera, smart watch, tracking device), a game console, a digital book reader, a telehealth/telemedicine (remote health and medicine) device, and a vehicle providing communication functionality (e.g., automotive, airplane, ship), and various combinations thereof.

The communication device is not limited to be portable or movable, and may also include any kind of apparatus, device or system being non-portable or stationary, such as a smart home device (e.g., an appliance, lighting, smart meter, control panel), a vending machine, and any other “things” in a network of an “Internet of Things (IoT)”.

The communication may include exchanging data through, for example, a cellular system, a wireless LAN system, a satellite system, etc., and various combinations thereof.

The communication device may comprise an apparatus such as a controller or a sensor which is coupled to a communication apparatus performing a function of communication described in the present disclosure. For example, the communication device may comprise a controller or a sensor that generates control signals or data signals which are used by a communication apparatus performing a communication function of the communication device.

The communication device also may include an infrastructure facility, such as a base station, an access point, and any other apparatus, device or system that communicates with or controls apparatuses such as those in the above non-limiting examples.

While exemplary embodiments have been presented in the foregoing detailed description of the present embodiments, it should be appreciated that a vast number of variations exist. It should further be appreciated that the exemplary embodiments are examples, and are not intended to limit the scope, applicability, operation, or configuration of this disclosure in any way. Rather, the foregoing detailed description will provide those skilled in the art with a convenient road map for implementing exemplary embodiments, it being understood that various changes may be made in the function and arrangement of steps and method of operation described in the exemplary embodiments and modules and structures of devices described in the exemplary embodiments without departing from the scope of the subject matter as set forth in the appended claims.

The invention claimed is:

1. A non-Access Point station (non-AP STA), comprising a receiver, which, in operation, receives, from an Access Point (AP), a frame including information to allocate frequency resources outside of an operating bandwidth of the non-AP STA; and circuitry, which, in operation, switches, based on the frame and using a padding included in a preceding Physical Layer Protocol Data Unit (PPDU) including the frame, to a channel on which the non-AP STA operates.

2. The non-AP STA of claim 1, wherein the receiver, after receiving the frame from the AP, receives, from the AP, a part of a Physical Layer Protocol Data Unit (PPDU) in the frequency resources based on the frame after reception of the frame.

3. The non-AP STA of claim 2, wherein the PPDU includes a plurality of data fields in different frequency segments for a plurality of non-AP STAs including the non-AP STA, and the plurality of non-AP STAs receive the frame and receive the PPDU based on the frame.

4. The non-AP STA of claim 2, comprising:

a transmitter, which, in response to the receiver receiving the frame, transmits a response frame, wherein after the AP receives the response frame, the receiver of the non-AP STA receives the part of the PPDU from the AP.

5. The non-AP STA of claim 1, wherein the operating bandwidth of the non-AP STA is narrower than a basic service set bandwidth of the AP.

6. The non-AP STA of claim 1, wherein the frequency resources are allocated on a per transmission opportunity (TXOP) basis.

7. The non-AP STA of claim 1, wherein the frame is transmitted in a non-high throughput (HT) duplicate Physical Layer Protocol Data Unit (PPDU).

8. The non-AP STA of claim 1, wherein the frame includes an association identifier (AID) of the non-AP STA.

9. The non-AP STA of claim 1, wherein the frame is a Trigger frame.

10. The non-AP STA of claim 1, wherein the non-AP STA switches between the operating bandwidth and the frequency resources based on the frame.

11. The non-AP STA of claim 1, wherein the operating bandwidth includes a Basic Service Set (BSS) primary channel.

12. The non-AP STA of claim 7, wherein a bandwidth of the non-HT duplicate PPDU is greater than 20 MHz.

13. The non-AP STA of claim 7, wherein the non-HT PPDU overlaps with a primary channel and a sec-primary channel.

14. A communication method for a non-Access Point station (non-AP STA), the communication method comprising receiving, from an Access Point (AP), a frame including information to allocate frequency resources outside of an operating bandwidth of the non-AP STA; and switching, based on the frame and using a padding included in a preceding Physical Layer Protocol Data Unit (PPDU) including the frame, to a channel on which the non-AP STA operates.

* * * * *